United States Patent
Bandodkar et al.

(10) Patent No.: US 12,477,030 B1
(45) Date of Patent: Nov. 18, 2025

(54) CLIENT-CONFIGURABLE IN-TRANSIT SEGMENTATION OF STREAMING INPUT AT MANAGED DATA TRANSFER SERVICES

(71) Applicant: Amazon Technologies, Inc., Seattle, WA (US)

(72) Inventors: Tanvi Mohandas Bandodkar, San Jose, CA (US); Manjunath Tumkur Maheshchandra, Santa Clara, CA (US); Chao Deng, Menlo Park, CA (US); Ayaskant Pani, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 17/491,077

(22) Filed: Sep. 30, 2021

(51) Int. Cl.
*G06F 16/28* (2019.01)
*H04L 67/06* (2022.01)

(52) U.S. Cl.
CPC ............ *H04L 67/06* (2013.01); *G06F 16/284* (2019.01)

(58) Field of Classification Search
CPC ............................... H04L 67/06; G06F 16/284
See application file for complete search history.

(56) References Cited

U.S. PATENT DOCUMENTS

| | | | |
|---|---|---|---|
| 8,856,374 B2 | 10/2014 | Uhlig et al. | |
| 9,794,135 B2 | 10/2017 | Theimer et al. | |
| 10,460,124 B2 * | 10/2019 | Wright | G06F 21/6227 |
| 10,467,105 B2 | 11/2019 | Theimer et al. | |
| 10,635,644 B2 | 4/2020 | Theimer et al. | |
| 10,659,511 B2 | 5/2020 | Van Wie et al. | |
| 10,691,716 B2 | 6/2020 | Theimer et al. | |
| 10,694,198 B2 | 6/2020 | Schierl et al. | |
| 10,795,905 B2 | 10/2020 | Theimer et al. | |
| 10,895,463 B1 * | 1/2021 | Cope | G06Q 10/02 |
| 11,113,244 B1 * | 9/2021 | Chen | G06F 16/1744 |
| 11,468,087 B1 * | 10/2022 | Slember | G06F 9/547 |
| 11,765,166 B1 * | 9/2023 | Bitter | H04L 63/0876 |
| 2003/0016407 A1 * | 1/2003 | Satoh | H04N 1/32074 358/402 |
| 2012/0131139 A1 * | 5/2012 | Siripurapu | H04L 65/60 709/217 |
| 2012/0310874 A1 * | 12/2012 | Dantressangle | G06F 16/221 707/600 |
| 2018/0150529 A1 | 5/2018 | Mcpherson et al. | |
| 2018/0243586 A1 * | 8/2018 | Ramezanzadeh Moghadam | A61N 5/1075 |
| 2019/0236062 A1 * | 8/2019 | Proctor | G06F 16/2365 |
| 2019/0279118 A1 * | 9/2019 | Beynel | G06Q 10/02 |
| 2019/0303380 A1 * | 10/2019 | Hyde | G06F 16/2365 |
| 2021/0084016 A1 * | 3/2021 | Dadhich | H04L 63/166 |
| 2022/0247695 A1 * | 8/2022 | Kulkarni | G06F 16/248 |
| 2022/0398128 A1 * | 12/2022 | Jose, Jr. | G06F 9/4881 |

(Continued)

*Primary Examiner* — Mohammad S Rostami
(74) *Attorney, Agent, or Firm* — Robert C. Kowert; Kowert, Hood, Munyon, Rankin & Goetzel, P.C.

(57) ABSTRACT

An indication of one or more record properties to be used to dynamically identify a storage object group to which records from one or more data sources are to be directed is received via a programmatic interface at a data transfer service. When a record is received from one of the data sources, a version of its content is stored at a storage destination chosen configured to store data of at least one storage object group identified using one or more computations performed on the one or more record properties.

20 Claims, 11 Drawing Sheets

(56) References Cited

U.S. PATENT DOCUMENTS

| | | | |
|---|---|---|---|
| 2023/0023084 A1* | 1/2023 | Gelle | G06F 3/0647 |
| 2023/0259874 A1* | 8/2023 | McAlister | G06N 5/025 |
| | | | 706/46 |

* cited by examiner

Obtain, e.g., via programmatic interfaces of a data transfer service (DTS) of a provider network, an in-transit segmentation descriptor indicating data record properties to be used to dynamically identify respective storage object groups (SOGs) to which content (either the original content, or transformed content) of data records from one or more streaming data sources is to be directed; the data records do not directly specify the SOGs, SOGs may not have been created in advance, and data records from multiple data sources may have to be directed to a single SOG   901

↓

Receive, at the DTS, messages containing respective data records from the data sources   904

↓

Determine, based on computations performed on the record properties indicated in the segmentation descriptor, respective segments to which each data record is to be assigned; store data records in intermediate storage after their segment identifiers are determined   907

↓

Transfer accumulated/batched records of each segment from the intermediate storage to a respective storage object group (e.g., a prefix of a bucket of an unstructured object storage service, or a database table) at a storage service; the storage object groups may be created dynamically based on the results of the computations on the records, and do not have to be created or named in advance   910

↓

In response to client requests, provide per-segment or per-storage object group metrics   907

*FIG. 9*

CLIENT-CONFIGURABLE IN-TRANSIT SEGMENTATION OF STREAMING INPUT AT MANAGED DATA TRANSFER SERVICES

BACKGROUND

Many modern applications involve the analysis of streaming data. For example, scientific applications may process records being gathered in real time by numerous environmental sensors, applications for managing large data centers may analyze large quantities of log messages being generated at various devices, finance applications may perform computations on millions of transaction records arriving from different locations, and so on. Data transfer applications such as ETL (Extract, Transform and Load) applications or services can be used to acquire, pre-process and store the streaming data for more detailed downstream analysis. In some cases the volumes of streaming data received at such services may become so large that timely downstream analysis can become a non-trivial technical challenge.

BRIEF DESCRIPTION OF DRAWINGS

FIG. 9 is a flow diagram illustrating aspects of operations that may be performed to implement in-transit segmentation of streaming records at a data transfer service, according to at least some embodiments.

Figure 1:
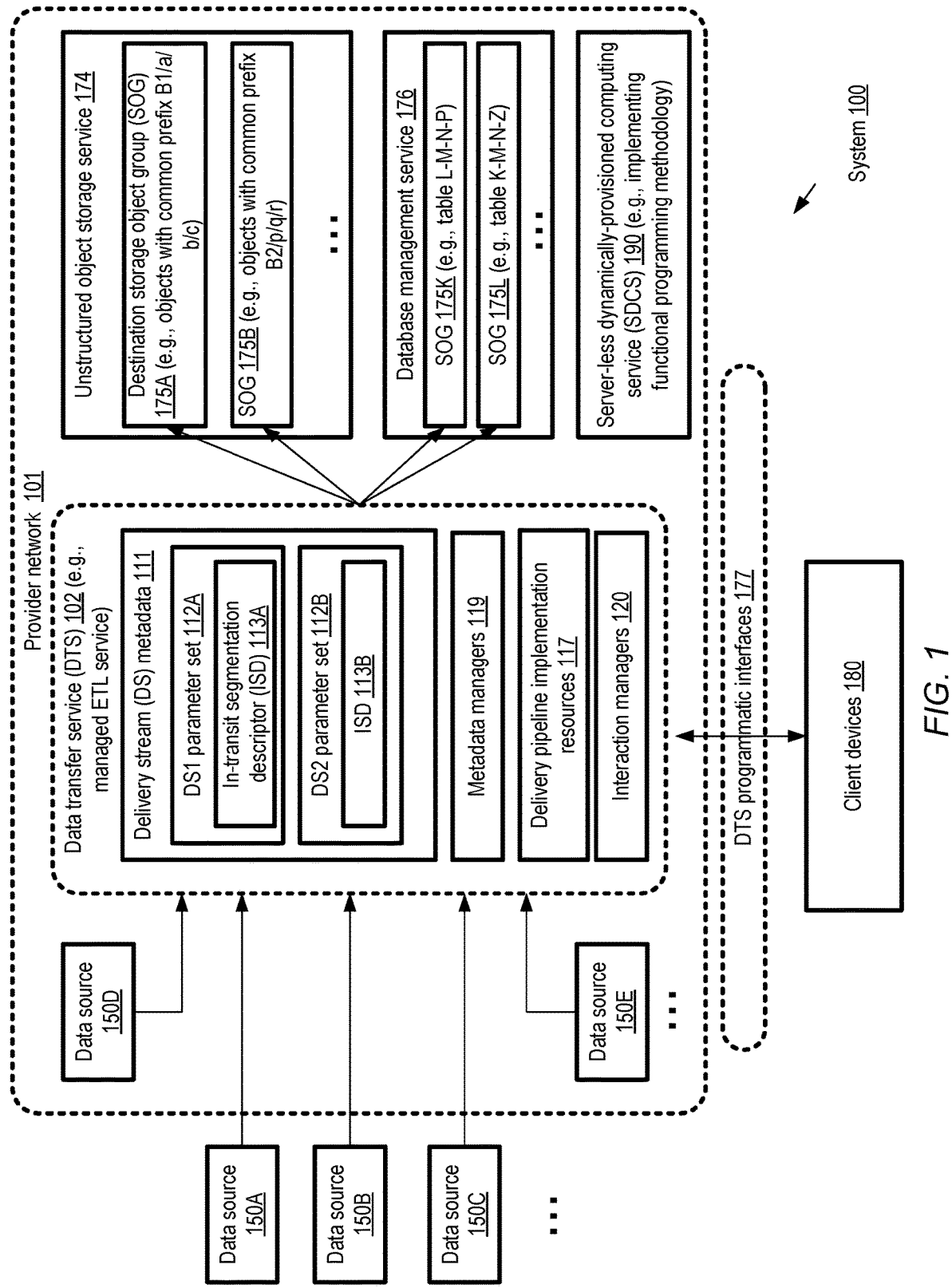
FIG. 1 illustrates an example system environment in which streaming input data received at a data transfer service of a provider network may be dynamically segmented based on client-specified parameters, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for dynamic segmentation of streaming data based on client-specified rules or parameters at a data transfer service such as a managed ETL service implemented at a provider network or cloud computing environment. A client of such a data transfer service (DTS) can indicate, e.g., via a request to create a delivery stream, one or more sources of streaming data records which are to be obtained at the DTS for a given application or a set of applications of the client. Logically-related subsets of the streaming data may then be transferred to respective storage object groups chosen at the DTS based on computations performed in transit on properties of the records' contents and/or on record metadata (such as record arrival times). The logically-related subsets can then be processed by downstream analytics tools or services, for example, and different access control settings can be used for respective logically-related subsets if desired. Various types of storage object groups (SOGs) can be dynamically created (e.g., by the DTS) and used for storing the records. A given storage object group (SOG) can, for example, comprise a logical grouping of unstructured objects (referred to as a prefix) within a collection or bucket of objects of an object storage service in some cases. In other cases an SOG can comprise a table of a relational database or a key-value data store. The type(s) of storage destinations to which the records are to be transferred may be indicated programmatically by the DTS client.

SOGs may not necessarily be created in advance in at least some embodiments; because the SOGs depend on attributes of the input data records whose values may not be known in advance, it may not even be feasible to create SOGs in advance in some cases. The messages containing the input streaming data received at the DTS, and the records themselves, may not directly indicate the SOGs to which the records are to be directed; instead, computations may have to be performed on the record contents or metadata to determine the SOGs in various embodiments. Because the streaming data is subdivided or segmented before the data is stored at destination data stores or storage services indicated to the DTS by the client, the subdivision is referred to as "in-transit" segmentation. The term in-transit partitioning may also be used to refer to the subdivision. In some cases, a multi-stage pipeline for performing the segmentation-related computations efficiently for extremely high rates of incoming data records may be implemented using numerous nodes of the DTS. Easy-to-use programmatic interfaces, such as web-based graphical user interfaces, may be implemented by a DTS to allow a client to indicate the parameters that are to be used to govern the dynamic segmentation of the streaming data. Using client-specified segmentation parameters, large volumes of streaming data may be organized into smaller stored subsets dynamically, simplifying downstream analysis. The in-transit segmentation techniques can also help improve security, e.g., by restricting access to some stored subsets if desired.

As one skilled in the art will appreciate in light of this disclosure, certain embodiments may be capable of achieving various advantages, including some or all of the following: (a) improving the overall speed at which streaming data can be analyzed for a variety of applications, by subdividing the data into more manageable sub-groups in transit and storing the sub-groups separately for sub-group-level analysis, (b) reducing the amount of computing resources and memory (e.g., the number of CPUs, the size of memory etc. required at a given server) that have to be employed, e.g., at a given server configured for processing or analysis of streaming data and/or (c) enhancing the security of streaming data, e.g., by funneling sensitive data dynamically to storage objects to which access is restricted.

According to some embodiments, a system may comprise one or more computing devices. The computing devices may include instructions that upon execution on or across the computing devices cause the computing devices to obtain, e.g., via one or more programmatic interfaces of a DTS of a provider network, an in-transit segmentation descriptor indicating one or more data record properties to be used to dynamically identify a respective SOG to which at least a portion of content of data records from one or more streaming data sources is to be directed. The descriptor may be submitted, for example, in a delivery stream creation request by a client on whose behalf the DTS is employed to manage ETL operations in some embodiments. Implementation of a single delivery stream managed using resources of the DTS may thus comprise the delivery of data records from one or multiple data sources specified by a DTS client to one or more types of destinations specified by the DTS client. The SOG to which a given data record is to be directed may not be specified directly within the message, received at the DTS, comprising the data record in various embodiments; that is, neither the data record itself (the payload of the message), nor any message metadata such as headers may directly specify the SOG.

After the in-transit segmentation descriptor is received, a message from one of the streaming data sources, comprising a data record for which the in-transit segmentation is to be performed, may be received at the DTS. The DTS may cause a version of at least a portion of contents of the particular data record (e.g., the original contents, or a transformed version thereof, where the transformation is also based on parameters received programmatically) to be stored at a destination within a storage service of the provider network. The destination (such as a bucket) may be configured to store at least a particular SOG (e.g., a records with a common bucket prefix) which is identified for the particular data record at least in part using results of one or more computations, performed by the DTS with respect to the particular data record, on the one or more data record properties indicated in the in-transit segmentation descriptor in various embodiments. The computations may for example include extracting values of one or more content elements of the particular data record, and/or examining metadata (which may be independent of the record contents) associated with the particular data record. In at least one embodiment, a storage object group (such as a bucket prefix, or a table) may have to be created at the storage service, e.g., in response to a programmatic request from the DTS, to store the particular data record. In some cases, a given data record may span multiple messages received at the DTS, and analysis of the contents of multiple messages may have to be performed to determine the destination SOG for the data record. In some embodiments a 1-to-1 mapping may exist between storage object groups and storage destinations—for example, each SOG may correspond to a given table of a database. In other embodiments multiple SOGs may be stored at a given storage destination: for example, an SOG may correspond to a prefix of multiple prefixes of a given bucket (the storage destination) created at an object storage service of the provider network, or multiple SOGs may be stored within a given database table. In some cases, the DTS may create SOGs (such as bucket prefixes) as and when needed, and/or create storage destinations (the buckets themselves) when needed. In at least one embodiment, the storage destination within which a given data record is to be stored may also be identified using data record properties indicated in an in-transit segmentation descriptor.

A distributed collection of nodes, with each node for example being implemented at respective servers or compute instances of the DTS, may be used for in-transit segmentation of the kind described above in some embodiments. In one such approach, a two-stage workflow may be used for the in-transit segmentation for data records arriving from multiple streaming data sources, such as respective shards of a stream managed by a streaming data management service (SDMS) of the provider network. Multiple such shards or partitions may be created at the SDMS, for example, because each shard has a respective resource limit and corresponding bandwidth limit associated with it, and the total bandwidth required for a given stream-based application may exceed the bandwidth limit of a given shard. In the first stage of the two-stage workflow, a respective node of the DTS may be assigned for performing an initial set of computations on records from a given data source. Thus, for example, a first node of the DTS may be assigned to perform a first category of computations with respect to data records from one streaming data source, and a second node may be assigned to perform the first category of computations with respect to data records from the second streaming data source. The first category of operations may for example comprise (a) determining a respective SOG identifier for individual ones of the data records, (b) storing, at an intermediary data store, a collection of data records for which a common SOG has been determined and (c) preparing metadata indicating the location at the intermediary data store of the collection of data records. In some cases, a service external to the DTS, such as a server-less dynamically provisioned computing service implementing a functional programming methodology may be invoked by a node of the DTS to implement at least some computations of the first category of computations.

The metadata generated at multiple nodes of the first stage may be transmitted to a node configured for the second stage in some embodiments. The second-stage node may be configured to collect the metadata from the first-stage nodes and perform a second category of operations (such as concatenating records belonging to a given SOG, performing a format transformation etc.) with respect to data originally received from multiple data sources. The second-stage node may cause, based at least in part on analysis the metadata it has received from multiple first-stage nodes, at least a respective portion of a first collection of records (directed to a particular SOG, and stored at the intermediate storage by one node of the first stage) and a second collection of data records (directed to the particular SOG, and stored at the intermediate storage by another node of the first stage) to be included in a payload of a write request directed to the storage destination selected for the set of streaming data sources.

In at least some embodiments, a DTS client may provide input regarding the manner in which write requests are to be prepared and submitted by the DTS on the client's behalf. For example, in an embodiment in which the billings cost of writing data to a storage service increases with the number of distinct write requests, a client may in general prefer that fewer writes be used for storing a given amount of data. In such an example scenario, a client may specify buffering requirements or preferences which can be used by the DTS to accumulate data records of a particular SOG before pushing the accumulated records to the storage destination. Buffering parameter preferences may for example be expressed in terms of some combination of time units (e.g., buffer records for T seconds and include all the accumulated records into a payload of a single write request), counts of records (e.g., combine up to a maximum of N buffered records into a single write request), and/or total size of write payloads (ensure that a given write request payload contains no more than M megabytes of data) in different embodiments.

For some types of applications, subdividing data streams based on time information pertaining to the individual records of the stream may be useful. According to some embodiments, respective event timestamps (e.g., timestamps of log records) may be extracted as attribute values from the content of individual records, and used to group the records in transit, either solely based on the timestamps, or based on timestamps combines with other attributes at a DTS. In other embodiments, instead of using timestamps which are included within the content of the records, timestamps which are available from record metadata, such as timestamps representing arrival times of the records at the DTS may be used. In at least some embodiments, representations of at least a portion of timestamps of data records may be used within an identifier of an SOG. For example, an SOG with an identifier 2021-08-05-09 may be used to group and store data records from multiple data sources with timestamps between 9 am and 10 am on Aug. 5, 2021, an SOG with an identifier 2021-08-05-10 may be used to group and store data records from the data sources with timestamps between 10 am and 11 am on Aug. 5, 2021, and so on.

As indicated above, SOGs may be stored at a variety of storage devices and destinations in different embodiments. In some cases, multiple SOGs may be stored within an object bucket or object container of an unstructured object storage service, with each SOG assigned a unique prefix within the context or scope of the object bucket. In embodiments in which there is a 1-to-1 relationship between SOGs and bucket prefixes, the terms "SOG" and "bucket prefix" may be used synonymously, and data records may be said to be stored at the bucket prefix. In other cases, an SOG may be stored at a portion of a database implementing the relational data model or a database implementing a non-relational data model. The portion of the database (e.g., a table) may, for example, be identified using the results of computations performed on data record attributes indicated in the applicable in-transit segmentation descriptor. An SOG may be stored at a search service or an indexing service in one embodiment. In some embodiments, while the computations to identify SOGs may be performed at least in part using resources of a provider network, the SOGs themselves may be stored at devices external to the provider network, such as devices at third-party storage services or analytics services.

According to some embodiments, a DTS may determine an error-record destination associated with a set of streaming data sources associated with an in-transit segmentation descriptor. In response to determining that an attempt to identify an SOG for a data record from one of the data sources has failed (e.g., if the data record does not appear to have a value for an attribute to be used to generate a segment key or an SOG identifier), the data record may be stored at the error-record destination. In one embodiment, if a client does not specify an error-record destination, the DTS may create an error-record destination on behalf of the client. In at least one embodiment, a client may opt in to receive notifications if/when the number of records directed to an error-record destination exceeds a threshold, and/or to receive explanations of why records were directed to the error-record destination.

A client may submit a request to modify an in-transit segmentation descriptor which the client had submitted earlier in some embodiments, e.g., by changing the set of record properties to be used to identify SOGs and/or the manner in which SOG identifiers are to be created from the record properties. For example, an additional record property to be used to identify SOGs may be indicated in the request to modify. In response, the DTS may save a representation of the changes, and use changed descriptor to perform in-transit segmentation on data records received after the changes have been saved. In the example where an additional record property was specified in the request to modify, that property may also be used to identify SOGs for data records received after the descriptor is changed.

According to one embodiment, in addition to indicating properties of records which are to be used for in-transit segmentation, a client may also submit content transformation rules for data records. Instead of storing the original version of the records at the desired SOGs, the DTS may store transformed versions of the record contents, obtained by applying the transformation rules in such an embodiment. In at least some embodiment, different transformation rules may be indicated for different SOGs, so that for example the manner in which the transformed version of a record R1 of an SOG1 is generated may differ from the manner in which the transformed version of a record R2 of a different SOG SOG2 is generated. In one embodiment, transformation rules may be included within in-transit segmentation descriptors.

In some embodiments, other services of a provider network may be employed by a DTS to perform some of the computations required for in-transit segmentation. For example, in one embodiment, a server-less dynamically provisioned computing service of the provider network may be employed to perform computations such as parsing the contents of individual data records, generating segment keys, concatenating records stored at an intermediate data store used during the in-transit segmentation workflow, and so on. Such a server-less dynamically provisioned computing service may for example, implement a functional programming model, in which requested functions or computations are performed on behalf of clients of the service without the clients having to acquire or reserve specific computation resources in advance.

The DTS may collect a variety of metrics with respect to in-transit segmentation, and provide the metrics upon request to the clients on whose behalf the segmentation was performed. Such metrics may for example include the total number of segments or SOGs created for records from a given set of input data sources, the sizes of the SOGs (i.e., the total number of records in each of the SOGs and/or the total number of bytes stored in each of the SOGs) or the statistical distribution of the sizes, the total number of write requests issued by the DTS for the records of a given set of input data sources, the number of records which were directed to an error-record destination, the average delay between receiving a record and storing the record at an SOG, the number of records received and processed at the DTS from each data source, and so on.

In at least some embodiments, as indicated above, a DTS may be implemented as part of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtualized compute service (VCS), data processing service(s) (e.g., map reduce, data flow, and/or other large scale data processing techniques), data storage services (e.g., object storage services, block-based storage services, or data warehouse storage services), packet processing services, data transfer services (e.g., managed ETL services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments, including a DTS of the kind introduced above. Network-accessible computing services can include an elastic compute cloud service (referred to in various implementations as an elastic compute service, a virtual machines service, a computing cloud service, a compute engine, or a cloud compute service). This service may offer compute instances of the kind discussed above (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units (CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments. In some embodiments, a DTS may utilize compute instances and/or software containers for processing data records of delivery streams.

The traffic and operations of the cloud provider network may broadly be subdivided into two categories in various embodiments: control plane operations carried over a logical control plane, and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which streaming input data received at a data transfer service of a provider network may be dynamically segmented based on client-specified parameters, according to according to at least some embodiments. As shown, system 100 comprises resources and artifacts of a data transfer service (DTS) 102 implemented as part of a suite of network-accessible services of a provider network 101. The suite of services may also include, among others, an unstructured object storage service 174, a database management service 176, and a server-less dynamically provisioned computing service (SCDS) 190 at which a functional programming methodology may be implemented. Some DTSs may be referred to as managed ETL services because they manage resources used to extract, transform and load data from various sources on behalf of their clients. A DTS can also be referred to as a data delivery service.

In the embodiment shown in FIG. 1, DTS 102 may implement a set of programmatic interfaces 177, which can be used by clients of the DTS to provide guidance regarding data transfers to be managed on the clients' behalf. Programmatic interfaces 177 may include, for example, a web-based console, command-line tools, graphical user interfaces, a set of application programming interfaces (APIs) and the like in different embodiments.

In at least one embodiment, a client may submit one or more programmatic requests via the interfaces 177 from a client device 180 (e.g., a laptop, desktop, or mobile computing device) to create a delivery stream for which in-transit segmentation is to be implemented. The request to create a delivery stream may indicate one or more data sources from which records are to be ingested or extracted by the DTS 102, one or more destination storage devices to which original or transformed versions of the records obtained from the data sources are to be stored, and details of the manner in which the records collectively acquired from the data sources are to be subdivided or mapped into storage object groups in at least some embodiments. Programmatic requests sent by clients may be received and interaction managers 120 of the DTS; the interaction managers may then transmit internal versions of the requests to other DTS components such as metadata managers 119, delivery pipeline implementation resources 117 and the like.

Corresponding to individual data streams requested by clients, a respective parameter set may be stored as part of delivery stream metadata 111 maintained by metadata managers 119 at the DTS 102 in the depicted embodiment. Thus, for example, DS1 parameter set 112A may comprise information about the input data sources, one or more storage destinations, and an in-transit segmentation descriptor 113A to be used for determining storage object groups (SOGs) within the storage destinations to which the record contents of a delivery stream SD1 are to be directed. Similarly, DS2 parameter set 112B may comprise information about the input data sources, one or more storage destinations, and an in-transit segmentation descriptor 113B to be used for determining SOGs within the storage destinations to which the record contents of a delivery stream SD2 are to be directed. Some data sources specified for data streams may be external to the provider network, such as data sources 150A, 150B or 150C; other data sources such as 150D or 150E may be within the provider network. External data sources such as 150A-150C may for example include sensors IoT (Internet of Things) devices, client-premise servers, and the like. Internal data sources 150D or 150D may, for example comprise servers or devices of other services of the provider network, such as a streaming data management service (SDMS), a log data management service, or the like. Some internal data sources may comprise resources of storage services or database services that can also be used to store the processed data records—e.g., data from one portion of unstructured object storage service 174 may be streamed as input to the DTS, segmented, and re-stored at the same service or at the database management service 176.

A given in-transit segmentation descriptor such as ISD 113A may indicate one or more data record properties to be used to dynamically identify a respective SOG 175 to which at least a portion of content of a plurality of data records from a one or more of the data sources 150 is to be directed. For example, the properties to be used to identify an SOG such as SOG 175A, 175B, 175K and/or 175L may include values of attributes included within the content of the records, content-independent metadata attributes like arrival times, record sizes and the like, or some combination of content-based and content-independent metadata in different embodiments. A given data record may comprise values for many different attributes, and only a subset of the attributes may be used to identify the SOG for the data record in at least some embodiments; in other embodiments, values of all the attributes may be used to identify an SOG. In some cases, the rules specified by a client for in-transit segmentation may result in a given data record being directed to more than one SOG—for example, a given record R1 (or a portion of R1) received from a data source 150A may be directed to a destination SOG 175A within unstructured object storage service 174, and R1 (or a portion thereof) may also be stored to a destination SOG 175L within the database management based on an ISD 113A specified by a DTS client. Note that the input data records received from the data sources may not be labeled with SOG identifiers, and may not directly indicate, the SOGs to which they are to be directed. In some cases, records received from the data sources 150 and processed by the DTS 102 may be stored at an indexing service or a search service implemented at the provider network or external to the provider network. In various embodiments, records processed at the DTS in response to client's requests may be received from any combination of data sources inside or external to the provider network, and may be written to any combination of storage destinations inside or external to the provider network. Destinations external to the provider network may include services implemented by third parties (i.e., by entities other that the provider network operator and the clients of the provider network).

When a message containing a particular data record is received at the DTS from a data source 150, a workflow for processing and delivering the contents of the record to the appropriate SOG may be initiated in the depicted embodiment. The workflow may in come implementations utilize several resources or nodes of the DTS, collectively referred to as delivery pipeline implementation resources 117 in the depicted embodiment. The delivery pipeline implementation resources may eventually cause a version of at least a portion of contents of the particular data record to be stored as part of one or more SOGs created at a storage destination such as an object bucket of the unstructured object storage service 174, a table within a database management service 176, or a destination external to the provider network. Each such storage destination may for example comprise one or more storage devices that have been set up or configured (e.g., by the DTS itself) to store one or more SOGs. The particular SOG to which a given record is directed may be identified in various embodiments based on computations performed by or orchestrated by the DTS with respect to the given record, on one or more data record properties indicated in the relevant in-transit segmentation descriptor. In some cases, for example, the computations may include extracting values of one or more content elements or attribute values of the data record, transforming, rearranging and/or re-formatting the extracted values, and so on. In at least one embodiment, the DTS may employ the SDCS and/or other services to perform at least some of the computations on various records. In some embodiments, subsets of records from a particular data source specified by a client of the DTS may be sent after in-transit segmentation to respective data storage services or destinations implementing different data models—e.g., one set of records from a given data source may be sent to an SOG within unstructured object storage service 174, while another set of records from the same data source may be sent to an SOG stored at a database management service 176.

In at least one embodiment, the workflow for in-transit segmentation of a given delivery stream may include a first stage of operations in which a respective DTS node is assigned to each of several data sources of the stream, and a second stage in which information provided by the nodes used for the first stage is combined or consolidated by a single second-stage node. The set of computations performed at or orchestrated by the first stage nodes may include, for example, (a) determining a respective SOG identifier for individual data records, (b) storing, at an intermediary data store, a collection of data records for which a common SOG identifier has been determined and (c) preparing metadata indicating the location at the intermediary data store of the collection of data records corresponding to the SOG identifier. The location metadata may be sent to the second-stage node by each of the first stage nodes in various embodiments. The second stage node may perform additional computations on the records, e.g., to transform the format of the records if such a transformation was indicated in a client request, and concatenate content of multiple records into the payloads of a single write request directed to the chosen SOG.

In some embodiments, clients may modify the settings used for their delivery streams, e.g., by submitting additional requests via the programmatic interfaces 177. In response to such a request, a metadata manager 119 may change one or more parameters of an ISD such as 113A or 113B, and cause the delivery pipeline implementation resources 117 to start employing the modified parameters for records of the input data streams of the delivery stream. In at least one embodiment, after a delivery stream has been created, a client may modify the set of input data sources of the delivery stream, and/or the set of storage destinations to be used for the records from the set of input data sources.

The objects stored at an unstructured object storage service 174 may be grouped into containers called buckets in some embodiments, and a given bucket may comprise records to which any of several prefixes are assigned. Prefixes may be used as the identifiers of SOGs in various embodiments. A given prefix may, for example, comprise a sequence of text characters or tokens determined using one or more computations applied to the properties of the data records which were indicated in the in-transit segmentation descriptor 113. For example, SOG 175A may comprise records with a prefix "B1/a/b/c", where B1 is the identifier of a bucket and/a/b/c is a portion of a prefix string within the bucket, while SOG 175B may comprise records with a prefix "B2/p/q/r" where B2 is the identifier of another bucket and/p/q/r is a portion of a prefix string within the other bucket. Individual records with a given prefix may be assigned a respective record identifier (e.g., an identifier selected by the object storage service), so that for example one record with a B1/a/b/c prefix may be fully identified using the string B1/a/b/c/55420-3783d, where 55420-3783d is the record identifier, while another record with the same prefix may be fully identified using the string B1/a/b/c/ 8564239a. Note that in at least some embodiments, while a prefix may appear to be similar to a hierarchical file system path, the objects with a given prefix may not necessarily be part of a directory or folder as is the case within file systems; instead, the prefix at an object storage service may represent a naming convention or a grouping convention which is not necessarily correlated with the physical location at which an object is stored. SOGs such as 175K or 175L within a given database management service (e.g., a relational database management service or a service implementing a non-relational data model) may be stored as respective tables (e.g., table L-M-N-P or table K-M-N-Z) in some embodiments. The names of the tables may be determined from results of the computations performed on record properties indicated in the applicable in-transit segmentation descriptor in such embodiments. In at least some embodiments, a string used as the identifier of an SOG may be generated based on the results computed from data record properties—e.g., if a prefix/p/q/r is generated as the SOG identifier for several different data records R1, R2 and R3, the same types of computations, when performed on each of the records, may in each case have resulted in the generation of the identical string/p/q/r. As such, the mapping of records R1, R2 and R3 to the same SOG may imply that the records share at least some properties, and the SOG thus represents a logically-related set of records.

Figure 2:
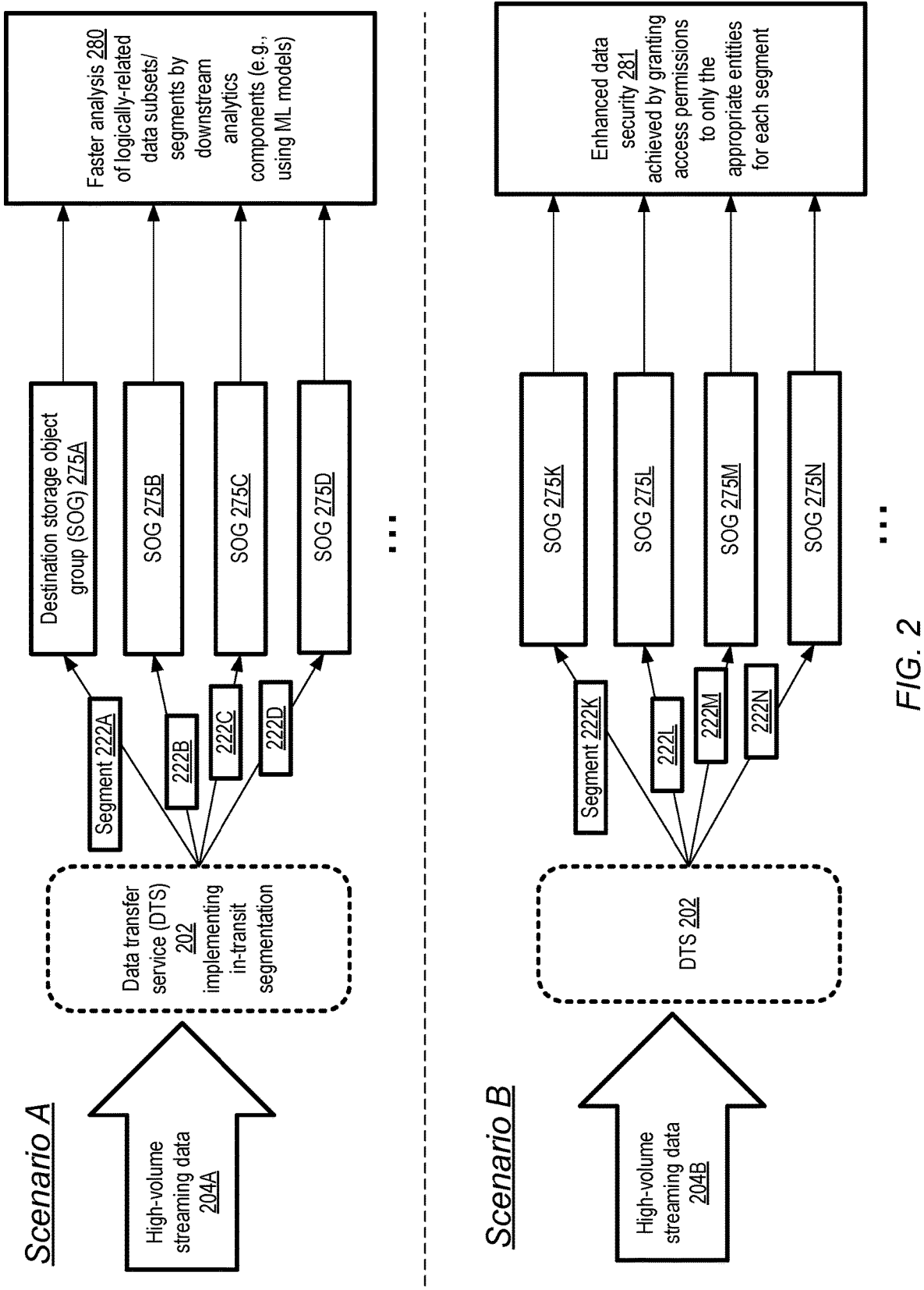
FIG. 2 illustrates example scenarios in which dynamic in-transit segmentation of streaming data may be employed at client request, according to at least some embodiments.

FIG. 2 illustrates example scenarios in which dynamic in-transit segmentation of streaming data may be employed at client request, according to at least some embodiments. In scenario A, a client may wish to subdivide records of high volume streaming data 204A, originating at numerous data sources, in order to speed up downstream analysis (e.g., analysis involving the use of machine learning models, statistical algorithms and the like). A DTS 202 implementing in-transit segmentation, similar in features and functionality to DTS 102 of FIG. 1, may be employed to subdivide the high volume streaming data into several different segments 222, each of which may then be stored at a respective destination SOG 275 accessible from an analytics service or tool. For example, segment 222A may be stored at SOG 275A, segment 222B may be stored at SOG 275B, segment 222C may be stored at SOG 275C, and segment 222C may be stored at SOG 275D. Respective analysis programs or processes may then access each of the SOGs, enabling analysis computations to be potentially performed in parallel while using smaller amounts of compute resources, memory and/or storage for each SOG's analysis than would have been required without segmentation. Faster analysis 280 of logically-related data subsets may thus be enabled by the DTS 202 in scenario A.

In scenario B, a client may wish to subdivide high volume streaming data 204B because of security considerations. Thus, DTS 202 may subdivide the streaming data 204B into segments 222K, 222L, 222M and 222N based on client-specified in-transit segmentation rules that take data access requirements into account. Different subsets of the entities within an organization may be granted access to individual ones of the SOGs 275K, 275L, 275M and 275N corresponding to respective segments. For example, only the members of a finance or audit department of an organization may be permitted to access and analyze contents of SOG 275K, members of an operations management team may be permitted to access and analyze contents of SOG 275L, members of a legal department may be permitted to analyze contents of SOG 275M, and so on. Enhanced data security 281 may thus be obtained using in-transit segmentation in scenario B, relative to scenarios in which segmentation is not performed by the DTS. In some scenarios, in-transit segmentation may be requested by a given client for performance reasons as well as security reasons. In at least one embodiment, clients may request in-transit segmentation for reasons other than performance or security—e.g., if the billing cost of a write request to a destination storage service or database service rises substantially when the size of the request payload crosses a threshold, a client may choose to implement in-transit segmentation based at least partly on cost considerations.

Figure 3:
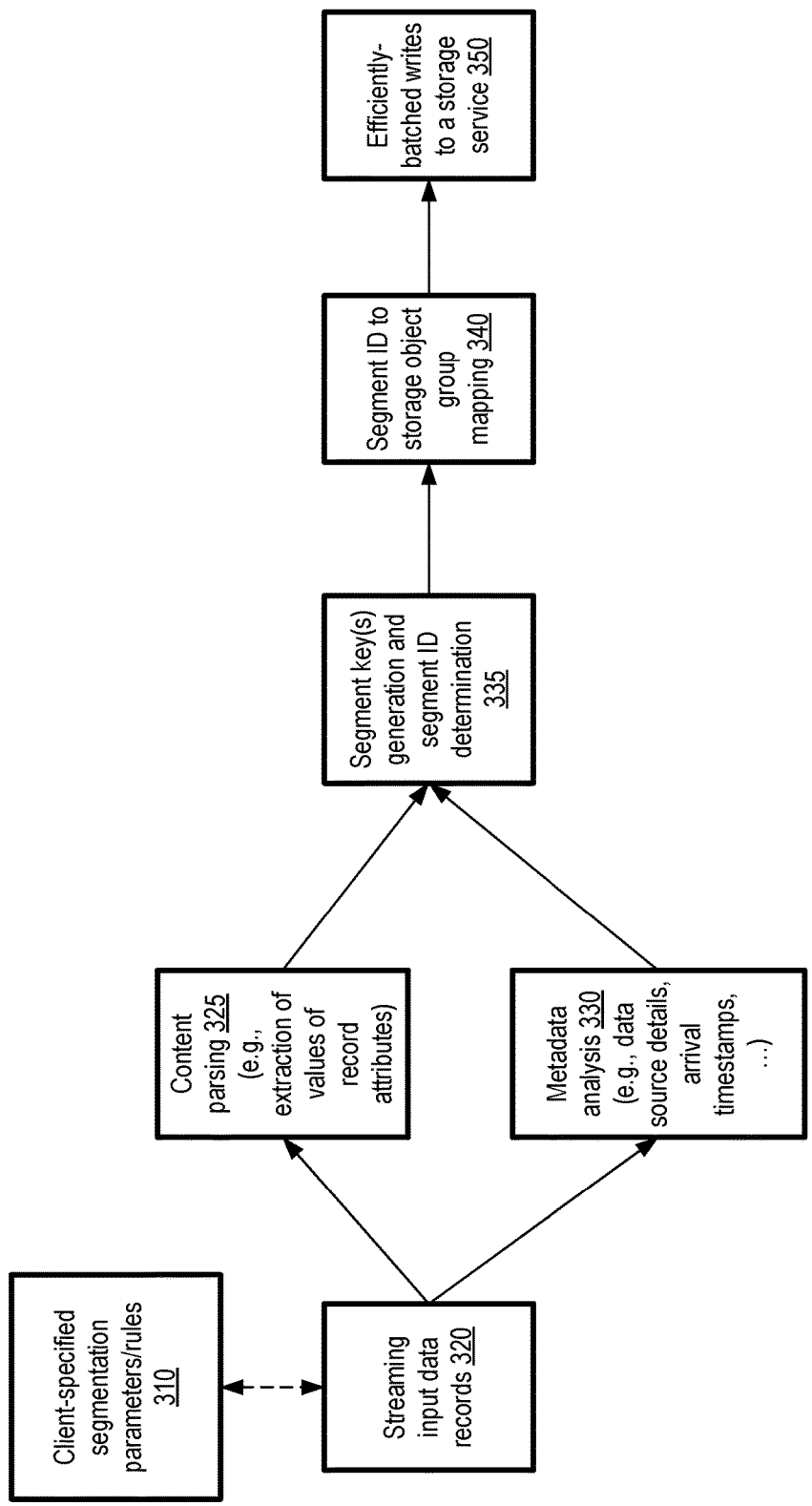
FIG. 3 illustrates an example high-level workflow for in-transit segmentation of streaming data, according to at least some embodiments.

FIG. 3 illustrates an example high-level workflow for in-transit segmentation of streaming data, according to at least some embodiments. In the embodiment shown in FIG. 3, client-specified segmentation parameters/rules 310 applicable to streaming input data records 320 from one or more data sources may be obtained at a data transfer service (DTS) similar in features and functionality to DTS 102 of FIG. 1. When an individual data record is received via a message directed at the DTS, content parsing 325 and/or record metadata analysis 330 may be performed.

Content parsing 325 may for example comprise extraction of values of one or more record attributes from the record. In some cases, streaming input data records may be at least partially structured, e.g., using JSON (JavaScript Object Notation) or a similar technology, and content parsing may comprise identifying values of structured content elements. In some embodiments, individual records may comprise an unstructured sequence of bytes, and content parsing may involve more complex semantic analysis of the bytes. In at least one embodiment, a client may not wish the DTS to have access to all the content of the data records, and the data records may be encrypted before they reach the DTS. In order to allow at least partial parsing of such records, the client may provide the DTS with executable code, or pointers to functions which can be executed (e.g., with the help of a service similar to the server-less dynamically-provisioned service (SDCS) 190 shown in FIG. 1) to extract the attribute values which may be needed to identify the storage object group (SOG) to which a record is to be mapped. Thus, some of the computations involved in determining destination SOGs may be performed by utilizing services other the DTS itself in at least some embodiments. In some embodiments, a parsing language similar to JQ may be employed to extract and/or transform record content, with the queries being specified by the client in a language chosen by the client and supported at the DTS.

Streaming input data records 320 may have associated metadata in various embodiments, such as timestamps generated to indicate the respective times at which the records are received or captured at the DTS, indications of a geographical region from which records are received (e.g., potentially related to a source Internet Protocol address of a data source), indication of the sizes of the records, the language in which the record text (if any) is expressed, and so on. Such metadata may be examined in some embodiments as part of metadata analysis 330, and the results of the analysis may also contribute to the identification of the SOG to which various records should be mapped in accordance with the client-specified segmentation parameters/rules 310.

In at least some embodiments, the content parsing results and/or metadata analysis results may be provided as input for segment key(s) generation and segment IPD determination 335 as part of the workflow for in-transit segmentation. A segment identifier may for example comprise a string, produced by combining or arranging one or more segment keys according to a specification indicated by the client, with individual ones of the segment keys corresponding to individual results of the content parsing and/or metadata analysis. In one simple example, if strings S1 and S2 are extracted from the content of a record based on client specified rules, and strings S3 and S4 are extracted from the metadata analysis of the record based on client specified rules, the segment keys may comprise the set of strings (S1, S2, S3 and S4), and a segment identifier may be generated by concatenating the keys in a format such as: S3-S4-S2-S1 if desired by the client.

In some embodiments, the dynamic segmentation workflow may comprise a step of mapping segment identifiers to storage object groups. This step may be performed, for example, if some segments are expected to comprise a substantially smaller amount of data than others, and the client wishes to consolidate smaller segments into a single SOG. Segment ID to storage object group mapping 340 may for example, comprise determining whether the segment ID of a record belongs to a set for which an N-to-1 mapping is indicated by the client in some embodiments. In other embodiments, there may be a 1-to-1 relationship between segments and SOGs, so segment ID to storage object mapping may not be required.

For each SOG, the workflow may comprise efficiently-batched writes to a storage service 350 in some embodiments. A client may specify time-based, record size based, and/or record count based buffering requirements, e.g., in an effort to ensure that the payloads of individual writes directed to the destination storage service are (at least in most cases) large enough to meet the client's requirements. A large number of write requests with smaller amounts of data per request may, for example, be less desirable than fewer larger writes in embodiments in which each write has an associated cost. Variations of the workflow depicted in FIG. 3 may be employed for in-transit segmentation in at least some embodiments. For example, some or all records may be reformatted or transformed in other ways based on client specifications as part of the workflow in some embodiments.

Figure 4:
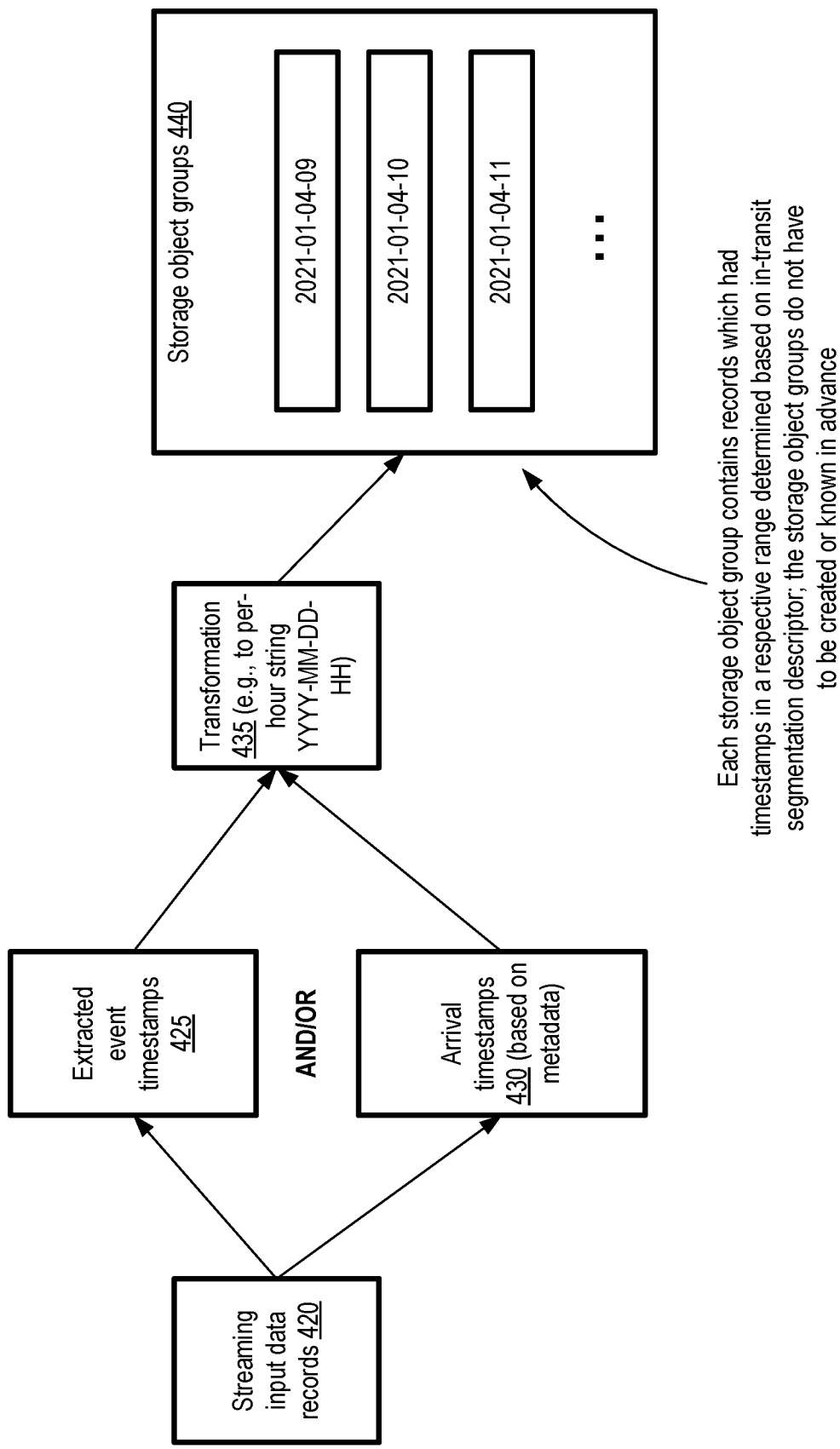
FIG. 4 illustrates an example scenario in which timestamps associated with streaming input data records may be employed for in-transit segmentation, according to at least some embodiments.

FIG. 4 illustrates an example scenario in which timestamps associated with streaming input data records may be employed for in-transit segmentation, according to at least some embodiments. In the depicted embodiment, two kinds of timestamps may be obtained for individual streaming input data records 420 received at a DTS similar to DTS 102 of FIG. 1. The first kind, referred to as extracted event timestamps 425, may be part of the content of the records. For example, in a scenario in which individual ones of the data records include one or more log records generated at a server, each log record may have an associated timestamp indicating the time at which the log record was stored at the server.

The second type of timestamp, arrival timestamps 430, may be part of the metadata associated with the records, and may be somewhat independent on the contents of the records. An arrival timestamp of a record may for example indicate a time at which the record was received at the DTS.

Depending on the preferences indicated by a client in the in-transit segmentation descriptor, one or both of the two types of timestamps may be used for segmentation. In the example scenario shown in FIG. 4, a transformation 435 may be applied (in which for example timestamps expressed in sub-second granularity are mapped to less granular time ranges such as minutes, hours or days) to the timestamp data, and SOGs may be identified based on the transformed timestamp information. For example, all the records with timestamps within a given hour between 9 am and 10 am on Jan. 4, 2021 may be assigned to an SOG 440 with an identifier 2021-01-04-09, records with timestamps between 10 am and 11 am on Jan. 4, 2021 may be assigned to an SOG with an identifier 2021-01-04-10, records with timestamps between 11 am and 12 noon on Jan. 4, 2021 may be assigned to an SOG with an identifier 2021-01-04-11, and so on. Each such SOG 440 may thus contain records which had timestamps in a respective range determined based at least in part on the in-transit segmentation descriptor indicated by the client in the depicted example. The SOGs may not have to be created or known in advance in at least some embodiments; instead, they may be created dynamically by the DTS as needed.

Figure 5:
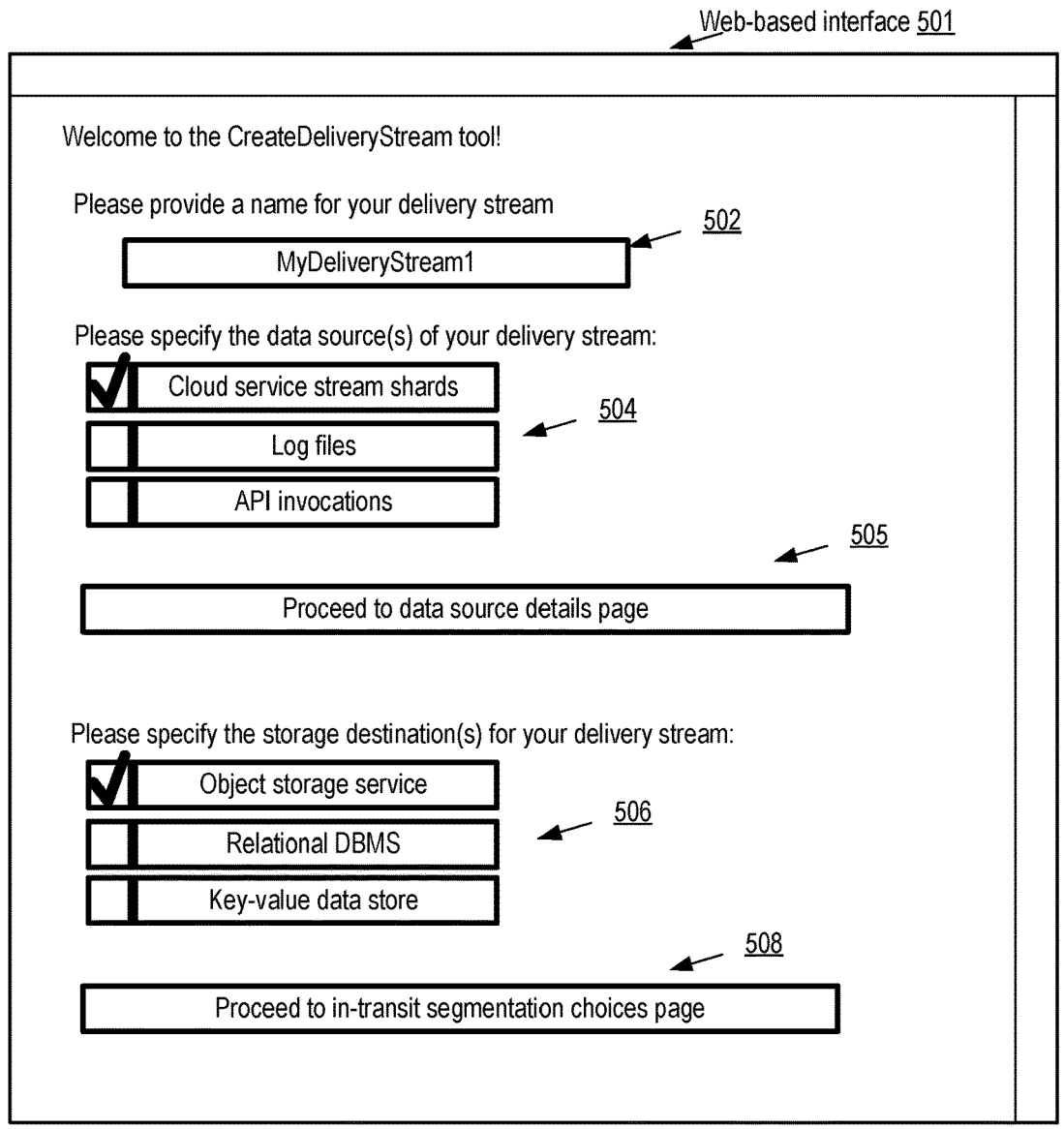
FIG. 5 and FIG. 6 collectively illustrate example graphical user interfaces which may be employed by clients of a data transfer service to configure in-transit segmentation of streaming data, according to at least some embodiments.
Figure 6:
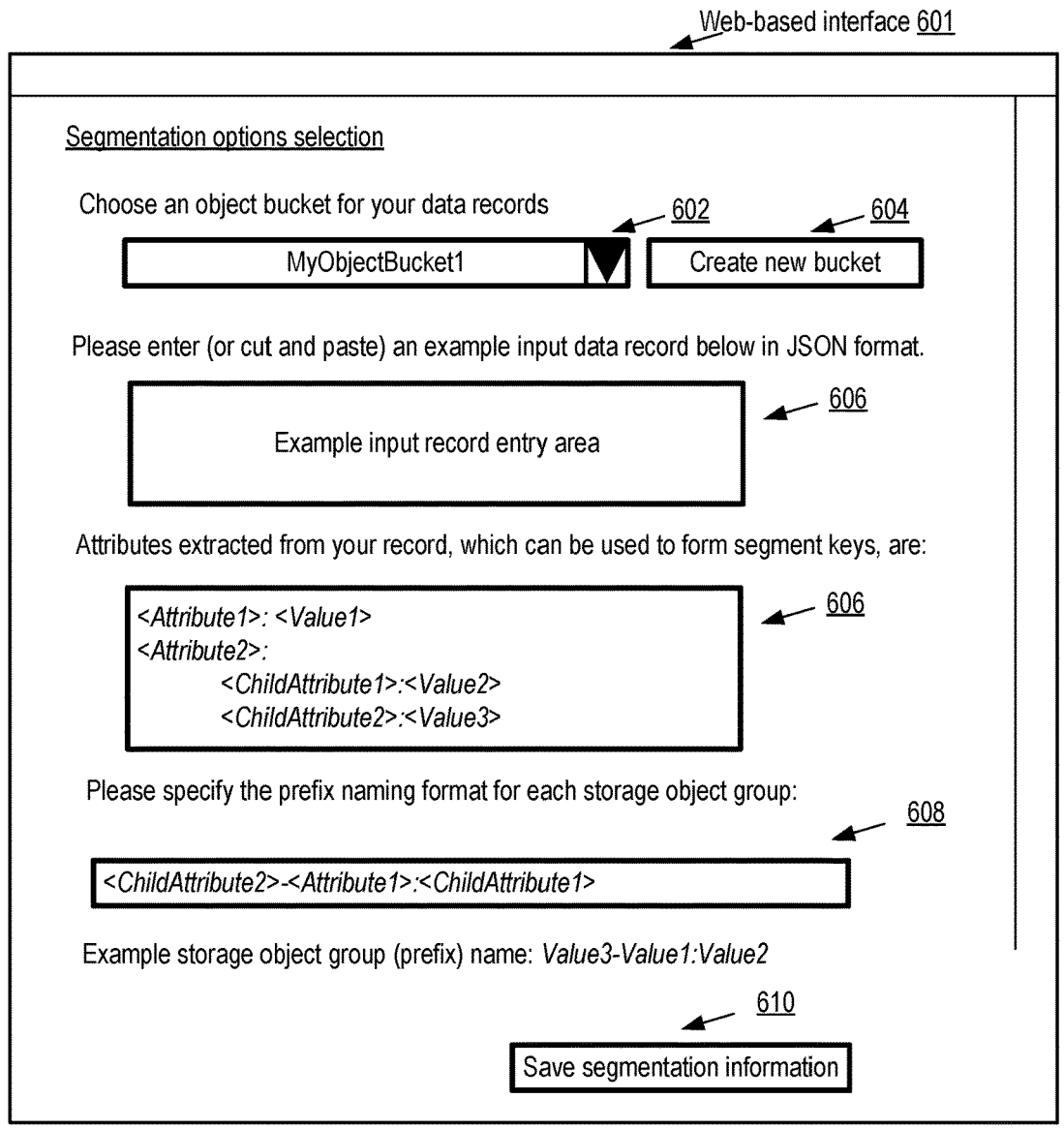

FIG. 5 and FIG. 6 collectively illustrate example graphical user interfaces which may be employed by clients of a data transfer service to configure in-transit segmentation of streaming data, according to at least some embodiments. Web-based interface 501 of FIG. 5, which may be implemented by a data transfer service similar to DTS 102 of FIG. 1, may include, for example, an interface element 502 which can be used by a client to specify a name for a delivery stream. The client may choose one or more categories of input data sources for the delivery stream using interfaces 504, such as respective shards or partitions of a data stream managed by a cloud-based streaming data services (denoted by "Cloud service stream shards" in FIG. 5), log files, API invocations and the like. Additional details about the input data sources, such as the name of the stream managed by the cloud-based streaming data services and the names/identifiers of the stream's shards, the servers at which the log files are being generated, and/or the endpoints to which record submission APIs of the DTS are to be directed, may be provided by a client after clicking on the "Proceed to data source details" interface element 505 in the depicted embodiment. Note that other types of data sources may be specified by clients if desired in some embodiments.

Web-based interface 501 may also enable clients to specify the type of storage service at which records of the delivery stream are to be stored, using interface elements 506. The client may, for example, choose an object storage service, a relational database management service, a key-value data store service and the like. The check marks shown in FIG. 5 indicate that the client has chosen cloud service stream shards as the data source for delivery stream MyDeliveryStream1, and that the records of the delivery stream are to be stored at an object storage service. Note that while only a single type of input data source and a single type of destination storage service has been indicated in the example shown in FIG. 5, in at least some embodiments a client may select several types of data sources and/or multiple types of storage destination services for a given data stream. Using interface element 508, the client may proceed to a web page, similar to web-based interface 601 of FIG. 6, in which further details about in-transit segmentation of the records of the delivery stream may be provided.

Depending on the kinds of storage destinations chosen by the client for a delivery stream created using an interface similar to web-based interface 501 of FIG. 5, the client may be provided one or more interfaces customized for providing further details about the storage destination(s) and the parameters to be used for in-transit segmentation in various embodiments. If the client chooses an object storage service as the destination, for example, interface elements 602 and 604 of web-based interface 601 may be presented to the client, enabling the client to choose a pre-created object bucket (via element 602) or to request the creation of a new object bucket (using element 604). A drop-down interface element may be used to select from among the set of buckets the client has created previously.

Interface element 606 may be used to enter an example input data record of the delivery stream in the embodiment shown in FIG. 6. In some embodiments, such a record may be formatted according to JSON or a similar formatting language. After the client enters the example record, the DTS may parse the contents of the record, and present them as potential segment keys within interface element 606 in the depicted scenario. The provided record has been parsed to identify values of attributes Attribute1, ChildAttribute1 and ChildAttribute2 (where ChildAttribute1 and ChildAttribute2 are sub-attributes of a parent attribute Attribute2). The manner in which the attributes extracted from the example record are to be combined to form the names of prefixes corresponding to individual storage object groups (SOGs) may be indicated by the client in interface element 608 in the depicted embodiment. If the client chooses to use the format <ChildAttribute2>-<Attribute1>:<ChildAttribute1>, an example SOG or prefix name would comprise the string "Value3-Value1:Value2" in the example scenario shown in FIG. 6. The interface element 610 may be used by the client to save the in-transit segmentation information. The type of information entered by the client using interfaces 501 and 601 may be used to populate elements of an in-transit segmentation descriptor stored for a delivery stream in various embodiments. As shown in FIG. 6, an indication of a plurality of properties or attributes of an example data record may be presented via an easy-to-use graphical user interface implemented by the DTS in various embodiments, and an indication of the specific properties or attributes whose values are to be used to dynamically identify an SOG for a record may be provided by the client using such an interface.

Figure 7:
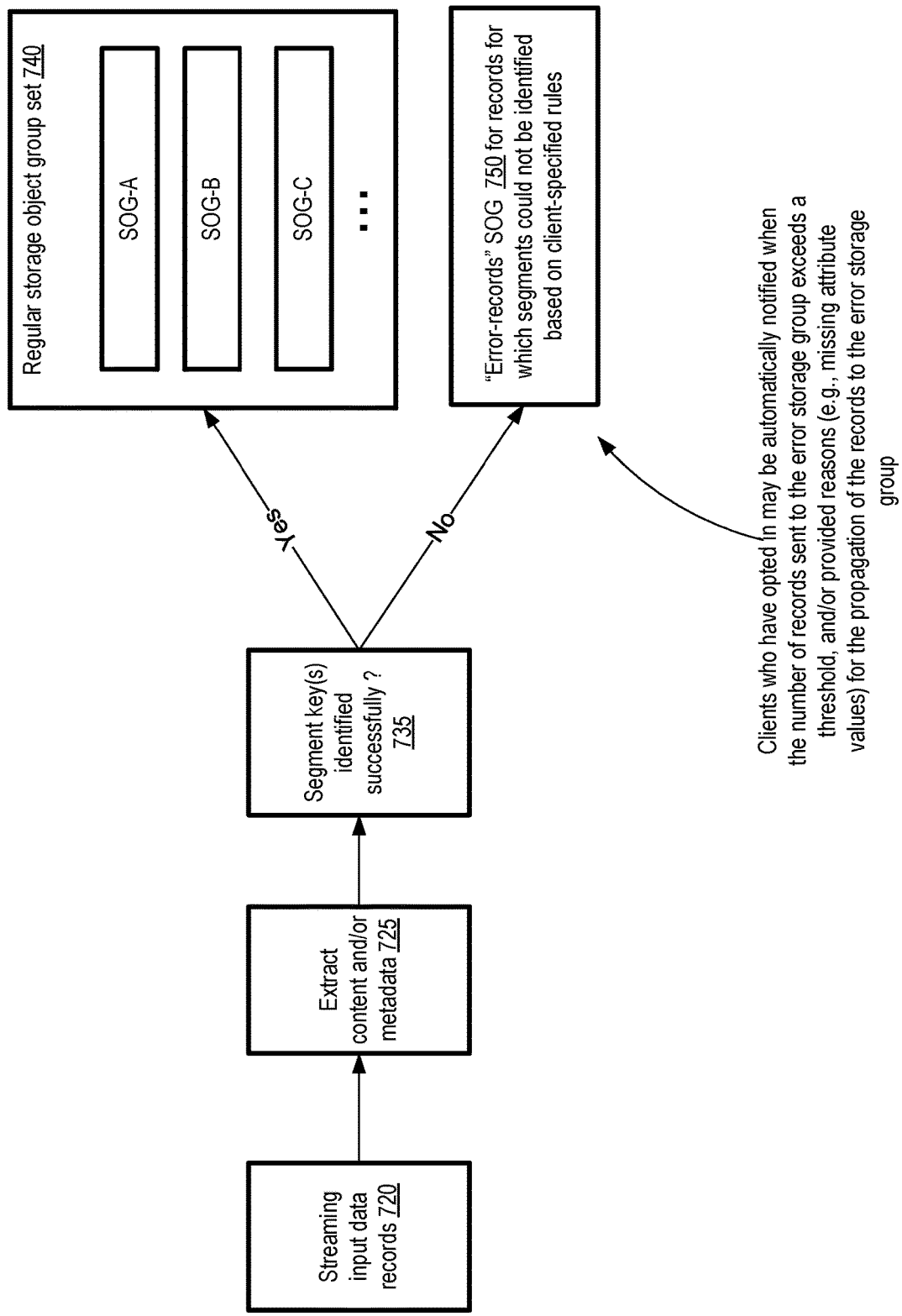
FIG. 7 illustrates an example scenario in which, if segmentation keys for some data records cannot be generated at a data transfer service, those records may be placed in a pre-selected location and clients of the data transfer service may be notified, according to at least some embodiments.

FIG. 7 illustrates an example scenario in which, if segmentation keys for some data records cannot be generated at a data transfer service, those records may be placed in a pre-selected location and clients of the data transfer service may be notified, according to at least some embodiments. In the embodiment depicted in FIG. 7, streaming input data records 720 from one or more data sources indicated by a client of a DTS similar to DTS 102 of FIG. 1 may be processed at the DTS to extract content and/or metadata 725 specified in an in-transit segmentation descriptor. The extracted information may be used as, or used to form, segment keys in the depicted embodiment, which can then be mapped to storage object groups SOGs of the kind discussed earlier.

It may sometimes be the case that segment keys cannot be extracted from one or more of the data records, for example, because values for one or more attributes were not present in the data records or because some of the relevant metadata associated with the data records was missing. To deal with such cases in which records cannot be successfully mapped to segments and SOGs, in at least one embodiment a special "error-records" storage object group 750 may be defined or created. For example, the client may specify a bucket prefix as the prefix to which records whose segment keys could not be determined are to be assigned, or a special error-records table may be created. If segment key(s) for a record are identified successfully (as shown in element 735), the record may be mapped to an SOG from a client-preference based regular storage group set 740 in the depicted embodiment, such as SOG-A, SOG-B or SOG-C. Otherwise, if a segment cannot be identified, i.e., if the attempt to identify an SOG based on client-specified rules fails, the record may be directed to an "error-records" SOG 750. In at least some embodiments, clients may be provided an interface which they can use to opt in to receive notifications when the number of records directed to an error-records SOG 750 exceeds a threshold. In one such embodiment, clients may also be notified or provided reasons (such as missing attribute values) for the propagation of the records to the error-records SOG.

Figure 8:
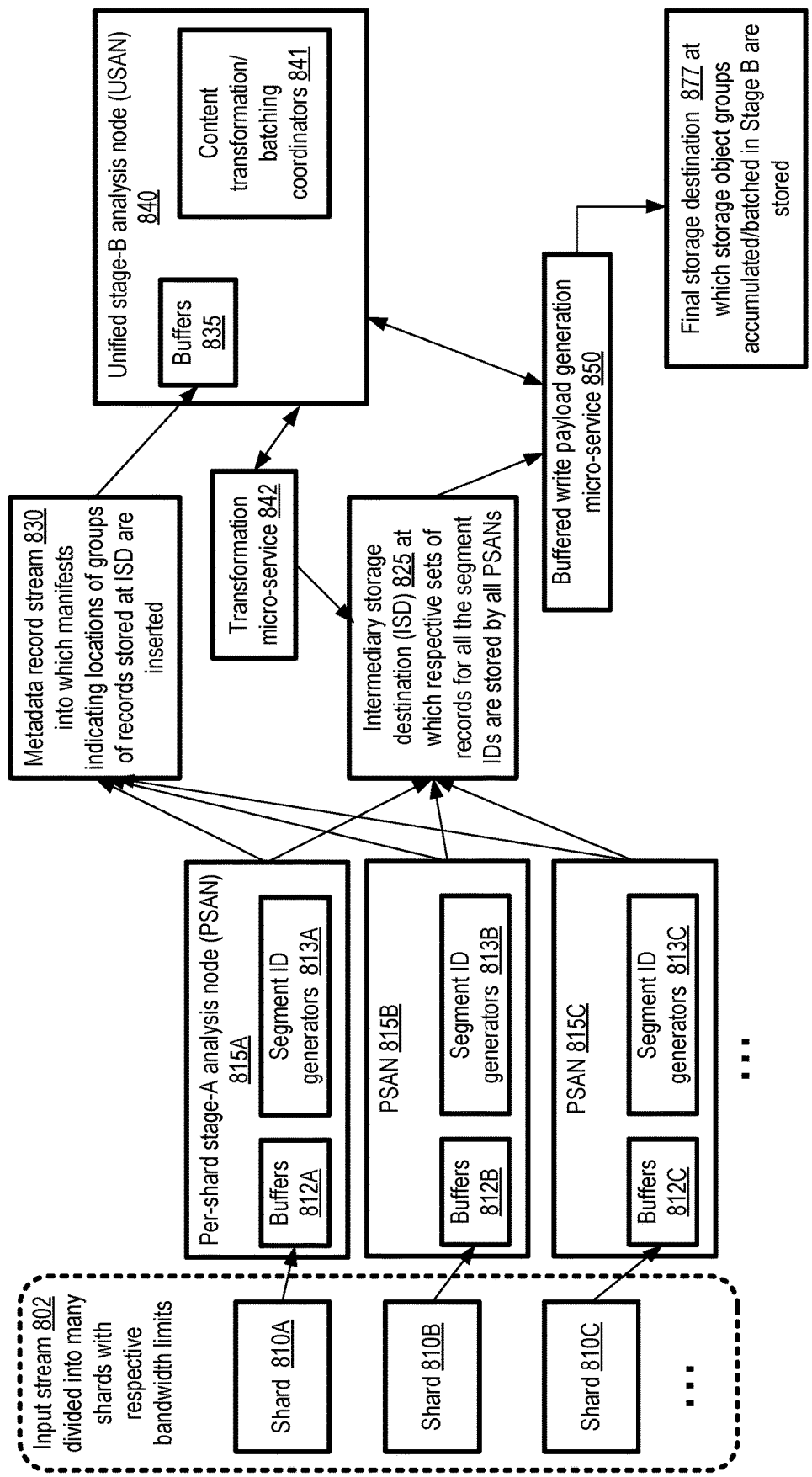
FIG. 8 illustrates an example distributed implementation of in-transit segmentation, according to at least some embodiments.

FIG. 8 illustrates an example distributed implementation of in-transit segmentation, according to at least some embodiments. In the depicted embodiment, a DTS may comprise a plurality of nodes that collectively implement a multi-stage workflow for in-transit segmentation of high volumes of streaming input data. A given node may for example comprise one or more processes running at a compute instance or virtual machine in some implementations. In other implementations, a node of the DTS may comprise one or more processes running at an un-virtualized server. At least two types of DTS nodes may be configured in the depicted embodiment: per-shard stage-A analysis nodes (PSANs) and a unified stage-B analysis node 840.

The data sources indicated by a client of the DTS may include a plurality of shards or partitions of an input stream 802 in the depicted embodiment, such as shard 810A, shard 810B or shard 810C. Each shard may comprise data records arriving at up to a shard-specific bandwidth limit, and multiple shards may be required to collect and process data at the rates required by the client's application. Corresponding to each shard or data source, a respective PSAN may be configured at the DTS. For example, PSAN 815A may be configured for shard 810A, PSAN 815B may be configured for shard 810B, and PSAN 815C may be configured for shard 810C. As the records of a given shard arrive at the DTS, they may be stored temporarily at a set of buffers 812 maintained at the PSANs, such as buffers 812A at PSAN 815A, buffers 812B at PSAN 815B, and buffers 812C at PSAN 815C. The buffering of arriving data records may be controlled by a set of parameters which may in some embodiments be indicated by a client. In other embodiments, the buffer parameters may be selected by the DTS, e.g., if a client does not specify the parameters. Buffering parameters may for example include a maximum amount of time a record is to be retained in a buffer 812 before it is processed, the maximum number of data records that can be accumulated in buffers 812 of a PSAN before the records are processed, the size of the buffers 812, the total amount of data (e.g., expressed in kilobytes or megabytes) that is allowed to be buffered before it is processed, etc. For example, in one implementation a client may indicate that the processing of buffered records to identify respective segment identifiers by a PSAN should be triggered by whichever of these three conditions is detected first: (a) T seconds have elapsed since the last time that generation of segment IDs was initiated for a group of earlier-buffered records, (b) the total number of currently buffered records reaches N or (c) the total amount of currently buffered data reaches K kilobytes.

Each of the PSANs 815 may comprise respective segment ID generators (e.g., one or more threads of execution) in the depicted embodiment. For example, PSAN 815A comprises segment ID generators 813A, PSAN 815B comprises segment ID generators 813B, and PSAN 815C comprises segment ID generators 813C. The segment ID generators may extract content and/or analyze metadata from individual data records, generate respective segment keys and determine the segment IDs; these operations may collectively be referred to as "stage-A" analysis of a two-stage analysis for in-transit segmentation implemented by the DTS. In some embodiments, a segment ID generator 813A may invoke a server-less dynamically-provisioned computing service (similar to SDCS 190 shown in FIG. 1) to execute a function on the contents of a data record, and the result of the function may comprise the segment keys or the segment ID. In at least one embodiment, a client on whose behalf the data records are being processed may specify or provide the function to be executed on the record contents. Such a function may, for example, extract values of one or more attributes of the data records and/or extract values from record metadata. Execution of a client-provided function to determine segment keys may enable the client to avoid revealing the full content of the data records to the DTS, which may be preferable to the client from a security perspective. In some embodiments, a client-provided function may also be used to transform contents of the data records. In one embodiment, a client may provide a query to be executed against the record contents and/or metadata to obtain one or more segment keys.

A given PSAN 815 may store a set of accumulated records corresponding to a given segment ID at a storage location within an intermediary storage destination (ISD) 825 in the depicted embodiment, and add a manifest indicating the storage location to a metadata record stream 830 consumed by unified stage-B analysis node (USAN) 840. Note that different PSANs 815 may process records that are part of the same segment in various embodiments. For example, a segment ID SID-A may be identified at PSAN 815A for 100 buffered records in one round of stage-A analysis, of shard 810A, and a segment ID SID-B may be identified at PSAN 815B for 65 buffered records of shard 810A in that round of stage-A analysis. PSAN 815A may store the 100 records corresponding to SID-A at a location Loc-A-1 within an intermediate storage destination such as a bucket within an object storage service, and PSAN 815A may store the 65 records corresponding to SID-B at a location Loc-B-1 within the intermediate storage destination. At about the same time that PSAN 815A processes these records, PSAN 815B may also determine that some number of records of shard are to be assigned to segments with IDs SID-A and SID-B. PSAN 815B may for example store 57 records corresponding to SID-A at a location Loc-A-2 within the intermediate storage destination, and PSAN 815B may for example store 123 records corresponding to SID-B at a location Loc-B-2 within the intermediate storage destination. Each of the PSANs may create a respective manifest record for each segment whose records they have stored, indicating for example (a) the segment ID and (b) the location at which the records are stored in the depicted embodiment. For example, PSAN 815A may create a manifest M1 for the 100 records of SID-A that it identified, and a manifest M2 for the 65 records of SID-B. Similarly, PSAN 815B may create a manifest M3 for the 57 records it identified for SID-A, and a manifest M4 for the 123 records identified for SID-B. Other manifests may be created by other PSANs such as 815C in the depicted embodiment. In embodiments in which there is a 1-to-1 mapping between segments and storage object groups (SOGs), the PSAN assigned to a given data source (such as a shard 810) may thus perform at least the following sets of operations: (a) determining a respective storage object group identifier for individual ones of the data records, (b) storing, at an intermediary data store, a collection of data records for which a common storage object group identifier has been determined, (c) preparing metadata indicating the location at the intermediary data store of the collection of data records and (d) transmitting the metadata to another node (a USAN).

The manifests may be sent from the PSANs 815 to unified stage-B analysis node (USAN) 840 in the depicted embodiment, for example as part of metadata record stream 830 managed by the same stream management service as input stream. In some embodiments, a different communication mechanism such as a message queue may be used to transmit the metadata to the USAN about the groups of records stored at the intermediate store destination. The USAN 840 may accumulate some number of manifests in a set of buffers 835. Parameters for the buffering of the manifests, analogous to the kinds of parameters mentioned above for incoming data records at the PSANs, may be specified by the client or chosen by the DTS in different embodiments.

In the embodiment shown in FIG. 8, the USAN may be responsible for orchestrating at least two types of operations: (a) a set of content transformation operations, such as changing the format of the records to optimized row columnar (ORC) format or to other similar column-oriented formats which facilitates further analysis of the data and (b) accumulating some number of records of a given segment into a payload of a single write directed to the final destination of the records, so as to reduce the costs associated with the writes in scenarios in which the cost increases with the total number of writes. These operations may collectively be referred to as "stage-B" analysis of a two-stage analysis for in-transit segmentation implemented by the DTS. In some embodiments, content transformation/batching coordinators 841 of the USAN 840 may offload the data transformation operations for the records corresponding to a buffered set or batch of manifests to a transformation microservice 842 which performs the transformations on the data records (indicated in the batched manifests) at the ISD 825. In other embodiments, the transformations may be performed at the USAN itself. For some delivery streams, content transformation operations may not be required in stage-B processing. In some embodiments in which records of a plurality of segments are to be written to a given SOG based on rules specified by the client, a mapping between segments and storage object groups may be performed at the USAN 840 in accordance with the client-specified rules.

In at least some embodiments, parameters for generating write payloads comprising some number of buffered data records for each segment or storage object group may be provided by a content transformation/batching coordinator 841 to a buffered write payload generation micro-service 850, along with the locations of the corresponding records within the ISD 825. The micro-service 850 may then buffer records according to the parameters, and issue write requests (each comprising some number of buffered records, either transformed or comprising the original content received from the input shards 810) to the final storage destination 877. In some implementations, a micro-service 850 may not be used; instead, the USAN may itself prepare the buffered write requests. Each of the write requests may be directed to a respective SOG (such as a prefix a bucket of an object storage service, or a database table) in the depicted embodiment, with each SOG comprising records of one or more segments identified in the stage-A processing. A client of the DTS may provide a buffering parameter set which is used to accumulate batches of the data records into write requests in the depicted embodiment. The buffering parameter set may, for example, indicate a time limit up to which records that are ready for writing to the final storage destination should be buffered before they are written, the maximum number of data records that should be included in a given write request, and/or the maximum amount of data that should be included in the payload of a given write request. In some embodiments in which very high volumes of data are being managed as part of a delivery stream, the use of micro-services similar to transformation micro-service 842 and buffered write payload generation micro-service 850, instead of performing the corresponding operations at a USAN itself, may avoid scenarios in which the ISAN runs out of memory. In at least one embodiment, a given node of a DTS may be utilized in a multi-tenant manner for multiple delivery streams—for example, the same node may be used as a PSAN for processing data records from a data source of a client C1's delivery stream as well as from a data source of a client C2's delivery stream, the same node may be used as a USAN for two different clients' delivery streams, or the same node may be used as a PSAN for one delivery stream and as a USAN for another delivery stream.

FIG. 9 is a flow diagram illustrating aspects of operations that may be performed to implement in-transit segmentation of streaming records at a data transfer service, according to at least some embodiments. As shown in element 901, an in-transit segmentation descriptor may be obtained via programmatic interfaces from a client of a DTS implemented at a provider network. The descriptor may indicate one or more data record properties (e.g., one or more attribute values extracted from record content, and/or one or more elements of metadata associated with a data record) to be used to dynamically identify respective storage object groups (SOGs) to which content of the data records from one or more streaming data sources is to be directed. In at least one embodiment, the descriptor may also indicate one or transformation rules to be applied to the content of data records before they are stored at an SOG; if such a transformation rule is provided, the DTS may also perform the requested transformation in transit, so that a transformed version of the data records is written to the SOG instead of the original version. Transformation rules may not be specified in some embodiments. The data records themselves, one or more of which may be included within a single message directed to the DTS or obtained by the DTS from a data source in some embodiments, may not directly indicate the SOGs to which the data records should be directed—that is, some computations may have to be performed on the data records contents or metadata to identify the SOGs. Data records from multiple data sources may have to be directed to the same SOG based on the record property-based logical grouping indicated in the descriptor in some embodiments.

One or more messages containing respective data records from the data sources may be received at the DTS (element 904) in the depicted embodiment. In some embodiments, each message may comprise one or more network packets, with the data record or records contained in the data payload portion of the message. The packet headers may contain metadata that may be used for identifying an SOG in some embodiments, such as an indication of a source IP address which can be mapped to at least an approximate geographical location. In one embodiment, an arrival timestamp may be determined for each message received at the DTS, and the arrival timestamp may constitute part of the metadata used for SOG identification. In other embodiments, metadata used for SOG identification may comprise the size of the data record. According to some embodiments, at least a portion of a data record received at the DTS may be compressed and/or encrypted.

Respective segments to which each received data record is to be assigned may be determined by performing one or more computations on the specified data record properties in various embodiments (element 907). In some cases, the computations may be performed within the DTS; in other embodiments, a node of the DTS may utilize another service of the provider network, such as a server-less dynamically-provisioned computing service implementing a functional programming methodology, to perform the computations. In one embodiment, e.g., in a scenario in which the data records are encrypted, the client on whose behalf in-transit segmentation is to be performed may provide a function which can be executed to extract one or more segment keys from the data records. Such a function may be executed at the server-less dynamically-provisioned computing service, keeping the actual contents (other than the extracted segment keys) of the records hidden from the DTS in some embodiments. Optionally, in some embodiments, the data records may be stored at an intermediate storage destination after their segments are identified, e.g., at a DTS-maintained bucket within an object storage service. At such an intermediate storage destination, the records may be grouped by segment—that is, records of a given segment may be stored contiguously or in close proximity to one another, and separated from the records of a different segment.

Accumulated or batched records of each segment may be transferred from the intermediate storage to a respective SOG at a storage service or destination in various embodiments, such as a prefix of a bucket created at an unstructured object storage service, or a database table (element 910). A given prefix may be assigned as the SOG for one or more segments in some embodiments. Note that storage object groups may be created or initialized dynamically, based on the results of the computations on the data records, and need not be created in advance (even their names may not be known in advance) in at least some embodiments. For example, if the computations involving segment keys indicate that a data record should be placed in an SOG with a name 2021-09-04-0900-Italy, and an SOG (e.g., a bucket prefix) with such a name does not currently exist, a new SOG with that name may be created dynamically by the DTS.

In response to client requests received via programmatic interfaces of the DTS, in various embodiments per-segment or per-SOG metrics may be provided to clients (element 907). Such metrics may for example include the total number of segments or SOGs created for records from a given set of input data sources, the sizes of the SOGs (i.e., the total number of records in each of the SOGs and/or the total number of bytes stored in each of the SOGs), the total number of write requests issued by the DTS for the records of a given set of input data sources, the number of records which were directed to an error-record destination, the average delay between receiving a record and storing the record at an SOG, the number of records received and processed at the DTS from each data source, and so on. It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Figure 10:
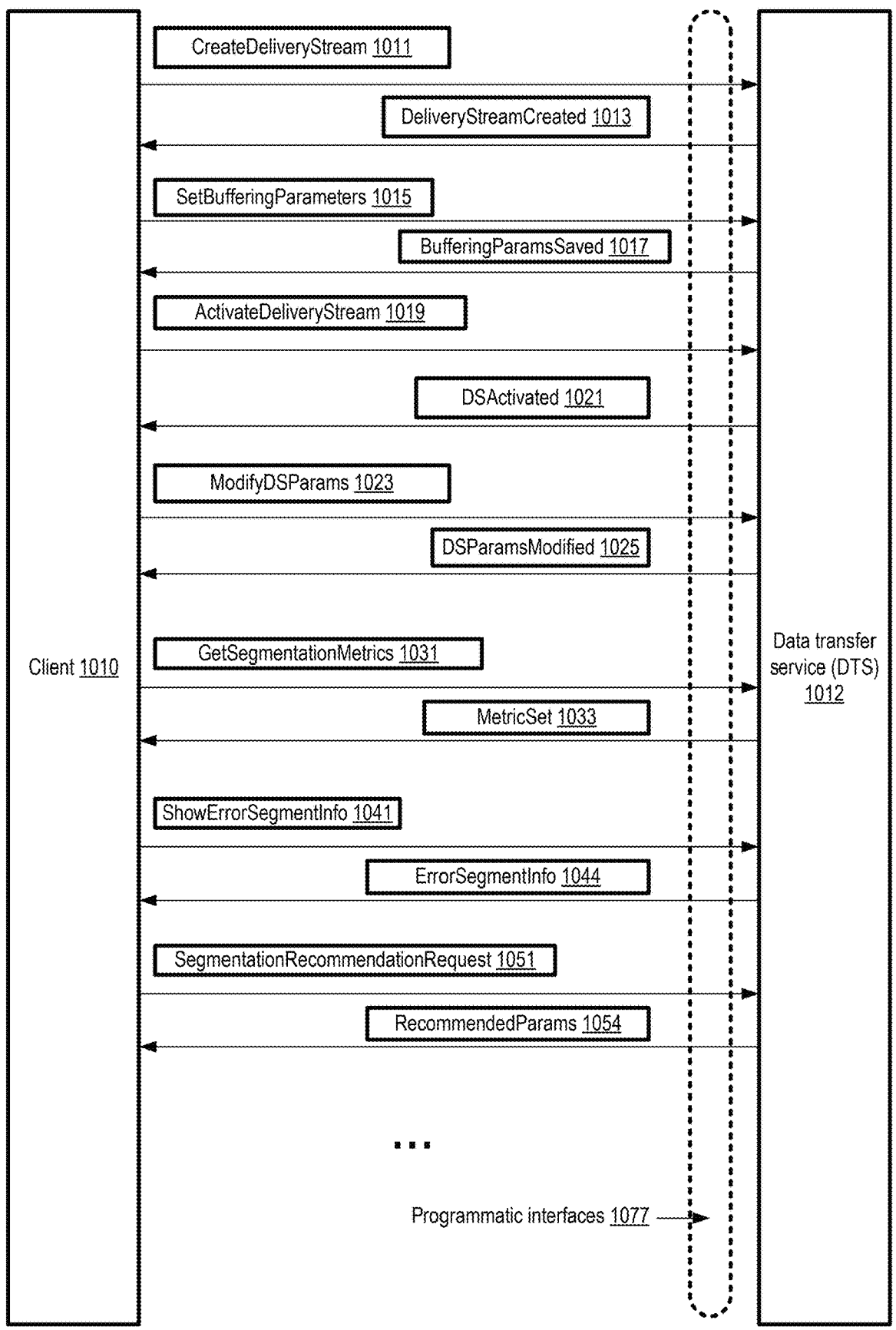
FIG. 10 illustrates example programmatic interactions between clients and a data transfer service, according to at least some embodiments.

FIG. 10 illustrates example programmatic interactions between clients and a data transfer service, according to at least some embodiments. In the embodiment shown in FIG. 10, a DTS 1012, similar in features and functionality to DTS 102 of FIG. 1, may implement a set of programmatic interfaces 1077 usable by DTS clients to communicate with the DTS. The programmatic interfaces may for example include a web-based console, command-line tools, graphical user interfaces, and/or a set of application programming interfaces. Using the programmatic interfaces 1077, a client 1010 may submit a CreateDeliveryStream request 1011 in the depicted embodiment, indicating a set of input data sources and an in-transit segmentation descriptor describing the manner in which one or more properties of data records obtained from the input data sources are to be used to identify storage object groups (SOGs) to which the records are to be directed. In some embodiments, the descriptor may indicate that one or more segment keys are to be generated from attribute values found in the content portion of the data records and/or from metadata attributes such as arrival timestamps, data record sizes, etc., and how the extracted segment keys are to be mapped to SOGs. In some embodiments, by default, a 1-to-1 relationship may be assumed to exist between segments and SOGs, and the default may be overridden if desired using the descriptor. The CreateDeliveryStream request or the in-transit segmentation descriptor may also include other parameters such as one or more data transformation rules to be applied to the received data records before storing the transformed version at a storage service destination configured to store one or more SOG. Examples of the storage service destinations include object buckets of an object storage service, tables of a database service and the like; information about the storage service destination may also be provided in the CreateDeliveryStream request in at least some embodiments. In one embodiment in which the data records are to be stored at an object storage service, each SOG may correspond to a respective prefix within a bucket; in other embodiments, a given SOG may correspond to multiple prefixes, or multiple SOGs may be stored with a common prefix. In response to the CreateDelivery Stream request, the DTS may store metadata indicating various properties of the requested delivery stream, and send a Delivery StreamCreated response 1013 to the client in at least some embodiments.

According to one embodiment, a client 1010 may specify a set of buffering parameters for one or more stages of the in-transit segmentation workflow for a delivery stream, using a SetBufferingParameters request 1015. The buffering parameter set may indicate, for example, the maximum duration for which a record which is ready for storage at a storage destination should be buffered before it is written to the storage destination, the threshold amount of data that can be buffered before it is written, the maximum number of data records that can be buffered at a time before they are written, and so on. The size of a batch of data accumulated into a single write request directed at the storage destination may, for example, be based at least in part on the buffering parameter set. In some embodiments, the client may specify such buffering parameters not just for the final writes directed to the storage destination, but also for various earlier stages of the workflow (such as parameters associated with buffers 812 and/or buffers 835 shown in FIG. 8). The provided buffering parameters may be stored as part of the delivery stream metadata at the DTS, and a BufferingParamsSaved message 1017 may be sent to the client.

In some embodiments, an ActivateDeliveryStream request 1019 may be submitted by a client 1010 to start the flow of data records of a delivery stream and the corresponding in-transit segmentation workflow. In response, the DTS may assign and/or activate resources (e.g., one or more PSANs and/or USANs in embodiments in which a distributed architecture similar to that shown in FIG. 8) to be used for in-transit segmentation and transformation of the data records, and the activated resources may start receiving and processing data records in accordance with the parameters provided by the client for the delivery stream. A DSActivated message 1021 may be sent to the client to indicate that the delivery stream has started processing data records in one embodiment. In one implementation, a separate ActivateDeliveryStream request may not be needed; instead, a delivery stream may be activated as soon as a CreateDeliveryStream request is received.

A client may create and activate a delivery stream with a set of parameters including an initial in-transit segmentation descriptor, and later change at least some parameters dynamically, without requiring the pausing of processing of the data records in at least some embodiments. A ModifyDSParams request 1023 may be submitted to modify an in-transit descriptor and/or to change other parameters of a specified delivery stream in the depicted embodiment. The parameters that are changed may include, for example, the set of data record properties to be used to identify SOGs for the records, the manner in which the properties are to be mapped to the SOGs, the number of data sources, the transformation rules to be applied to data records, the storage destinations used, and so on. The DTS may store the changed parameters or the modified version of the descriptor as part of the delivery stream metadata, and send a DSParamsModified message 1025 to the client to indicate that the changes have been saved and will be applied for subsequent messages as soon as feasible (for example, after records that have already been received are processed according to older pre-modification parameters).

A GetSegmentationMetrics request 1031 may be submitted by a client 1010 to obtain metrics pertaining to the dynamic in-transit segmentation of input data of a delivery stream in the depicted embodiment. Such metrics may for example include the total number of segments or SOGs created for records of a specified delivery stream, the sizes of the SOGs (i.e., the total number of records in each of the SOGs and/or the total number of bytes stored in each of the SOGs), the total number of write requests issued by the DTS for the records of a delivery stream, the number of records which were directed to an error-record destination, the average delay between receiving a record and storing the record at an SOG, the number of records received and processed at the DTS from each data source, and so on. In response, the relevant segmentation-related metrics collected by the DTS may be returned to the client via one or more MetricSet messages 1033 in some embodiments.

A client 1010 may obtain information about the data records for which segments or SOGs could not be found at the DTS, e.g., due to missing or invalid attribute values, missing metadata, malformed record contents, etc., by submitting a ShowErrorSegmentInfo request 1041 in the depicted embodiment. Information about the errors encountered when trying to identify SOGs for the data records, such as the total count of such records, the content of the records, the specific reasons why the attempts to determine the SOGs failed, and so on, may be provided to the client via one or more ErrorSegmentInfo messages 1044 in some embodiments.

According to some embodiments, a client may allow the DTS to analyze metrics associated with one or more delivery streams (e.g., via an opt-in interface) and potentially recommend changes to the segmentation-related parameters of the delivery streams. A SegmentationRecommendationRequest 1051 may be submitted by the client in such an embodiment to obtain such recommendations, and the DTS may respond with a RecommendedParams message 1054 indicating the recommendations generated based on its analysis. The recommendations may for example, indicate potential changes to buffering requirements, potential changes to mappings between segments and SOGs, and so on in different embodiments. In some embodiments, the DTS may track the rate at which data records are being obtained from various data sources, and generate parameter recommendations based on trends observed in the input record arrival rates—for example, one of the recommendations may comprise subdividing current SOGs into smaller SOGs due to the increased rate of streaming data arrival. In some embodiments, the client 1010 may indicate constraints and/or goals (e.g., the maximum desired size of an SOG) and the DTS may use those constraints to generate the recommendation. In some embodiments, programmatic interactions other than those shown in FIG. 10 may be supported at a DTS. For example, a DeleteDeliveryStream API may be supported for terminating further processing of data of a delivery stream created earlier.

Figure 11:
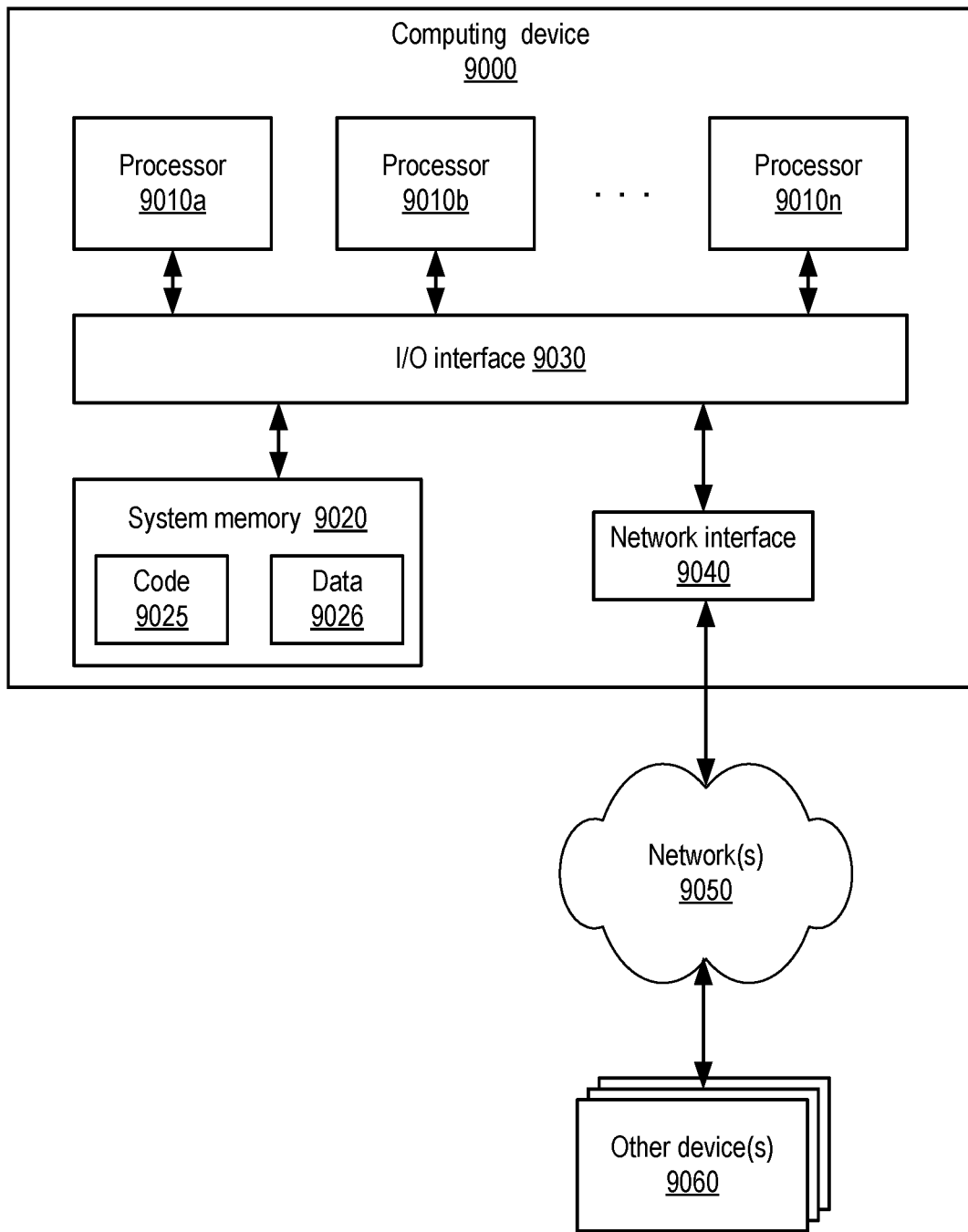
FIG. 11 is a block diagram illustrating an example computing device that may be used in at least some embodiments.

In at least some embodiments, a server that implements the types of techniques described herein (e.g., various functions of a DTS and other services of a provider network), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
provide one or more programmatic interfaces for receiving client-specified in-transit segmentation descriptors for a data transfer service of a provider network,
wherein the client-specified in-transit segmentation descriptors indicate data record properties of records to be received via messages, the data record properties to be used to dynamically identify respective storage object groups to which at least a portion of content of individual ones of a plurality of data records in messages from a plurality of streaming data sources is to be directed, and
wherein a storage object group to which a data record, of the plurality of data records, is to be directed is not specified within the corresponding one of the messages, received at the data transfer service, comprising the data record;
obtain, via one or more of the programmatic interfaces, a first in-transit segmentation descriptor of the client-specified in-transit segmentation descriptors;
receive, at the data transfer service, a particular message from a streaming data source of the plurality of streaming data sources, wherein the particular message comprises a particular data record having one or more data record properties;
obtain results of one or more computations performed on the one or more data record properties of the particular data record, the one or more data record properties indicated in the first in-transit segmentation descriptor obtained via the one or more programmatic interfaces, wherein the one or more computations include extracting values of one or more content attributes of the particular data record;
create, responsive to said obtain results of the one or more computations, a particular storage object group, of the storage object groups; and
cause a version of at least a portion of contents of the particular data record to be stored at a destination, within a storage service of the provider network, comprising the particular storage object group created responsive to said obtain the results of the one or more computations.

2. The system as recited in claim 1, wherein the destination within the storage service is an object bucket of an unstructured object storage service, wherein individual storage object groups are assigned respective prefixes within the object bucket, and wherein a prefix of the particular storage object group comprises a sequence of characters determined at least in part using the one or more computations.

3. The system as recited in claim 1, wherein the one or more computing devices include further instructions that upon execution on or across the one or more computing devices further cause the one or more computing devices to:
obtain, via the one or more programmatic interfaces, at the data transfer service after the particular data record is received, a request to modify the first in-transit segmentation descriptor; and
utilize, to identify a storage object group for another data record received at the data transfer service from a streaming data source of the plurality of streaming data sources, an additional data record property which was included in the first in-transit segmentation descriptor in accordance with the request to modify.

4. The system as recited in claim 1, wherein the one or more computing devices include further instructions that upon execution on or across the one or more computing devices further cause the one or more computing devices to:
receive, at the data transfer service via the one or more programmatic interfaces, a buffering parameter set, wherein the version of the portion of contents of the particular data record is included in a batch of data written to the destination in a single write operation, wherein the batch of data is accumulated based at least in part on the buffering parameter set.

5. The system as recited in claim 1, wherein the one or more computing devices include further instructions that upon execution on or across the one or more computing devices further cause the one or more computing devices to:
receive, at the data transfer service via the one or more programmatic interfaces, an indication of a function to be executed to extract a value of a content attribute of the one or more content attributes, wherein the particular data record is received at the data transfer in an encrypted form; and
utilize, by the data transfer service, a server-less dynamically-provisioned computing service to execute the function with respect to the particular data record.

6. A computer-implemented method, comprising:
providing one or more programmatic interfaces, of a data transfer service, for receiving a client-specified indication of one or more data record properties of records to be received via messages,
the data record properties to be used to dynamically identify a respective storage object group to which at least a portion of content of individual ones of a plurality of data records in one or more messages from one or more data sources is to be directed;

obtaining, via one or more of the programmatic interfaces, the client-specified indication of one or more data record properties;

receiving, at the data transfer service, a particular message from a data source of the one or more data sources, wherein the particular message comprises a particular data record having one or more data record properties;

identifying, using one or more computations performed on the one or more data record properties of the particular data record of the particular message, a particular storage object group, wherein the one or more data record properties on which the computations are performed are indicated in the client-specified indication obtained via the one or more programmatic interfaces; and causing a version of at least a portion of content of the particular data record to be stored, by the data transfer service, at a storage destination comprising the particular storage object group identified using the one or more computations performed on the one or more data record properties of the particular data record.

7. The computer-implemented method as recited in claim 6, wherein the one or more data sources comprise a first streaming data source and a second streaming data source, the computer-implemented method further comprising:

assigning a first node of the data transfer service to perform a first category of operations with respect to data records from the first streaming data source, and a second node of the data transfer service to perform the first category of operations with respect to data records from the second streaming data source, wherein the first category of operations comprises (a) determining a respective storage object group identifier for individual ones of the data records, (b) storing, at an intermediary data store, a collection of data records for which a common storage object group identifier has been determined and (c) preparing metadata indicating a location at the intermediary data store of the collection of data records.

8. The computer-implemented method as recited in claim 7, further comprising:

transmitting, from the first node to a third node of the data transfer service, metadata indicating the location, at the intermediary data store, of a first collection of data records to which a first storage object group identifier was assigned at the first node wherein the third node is assigned to perform a second category of operations with respect to data records from a plurality of streaming data sources including the first and second streaming data sources;

transmitting, from the second node to the third node, metadata indicating the location, at the intermediary data store, of a second collection of data records to which the first storage object group identifier was assigned at the second node; and causing, by the third node, using at least the metadata received from the first and second nodes, at least a respective portion of the first and second collection of data records to be included in a payload of a write request directed to the storage destination.

9. The computer-implemented method as recited in claim 6, wherein the one or more data record properties include a respective timestamp associated with individual ones of the data records, wherein a representation of at least a portion of a timestamp associated with the particular data record is included within an identifier of the particular storage object group.

10. The computer-implemented method as recited in claim 6, wherein the storage destination is an object bucket of an unstructured object storage service, wherein individual ones of the storage object groups used for storing content of records from the one or more data sources are assigned respective prefixes within the object bucket, and wherein a prefix of the particular storage object group comprises a sequence of characters determined using the one or more computations.

11. The computer-implemented method as recited in claim 6, wherein the storage destination comprises a portion of a database implementing one of (a) a relational data model, or (b) a non-relational database model, and wherein an identifier of the portion of the database is determined at least in part using the one or more computations.

12. The computer-implemented method as recited in claim 6, further comprising:

determining, at the data transfer service, an error-record destination associated with the one or more data sources; and in response to determining that an attempt to identify a storage object group for another data record obtained from a data source of the one or more data sources was unsuccessful, causing contents of the other data record to be stored at the error-record destination.

13. The computer-implemented method as recited in claim 6, wherein the storage destination comprises a portion of a search service or an indexing service.

14. The computer-implemented method as recited in claim 6, wherein the data transfer service is implemented at least in part at a provider network, and wherein the storage destination is external to the provider network.

15. The computer-implemented method as recited in claim 6, wherein the particular data record comprises respective values of a plurality of attributes including a first attribute and a second attribute, wherein the one or more data record properties (a) include the first attribute and (b) exclude the second attribute.

16. One or more non-transitory computer-accessible storage media storing program instructions that when executed on or across one or more processors:

provide one or more programmatic interfaces, of a data transfer service, for receiving a client-specified indication of one or more data record properties of records to be received via messages, the data record properties to be used to dynamically identify a respective storage object group to which at least a portion of content of individual ones of a plurality of data records in one or more messages from one or more data sources is to be directed;

receive, at the data transfer service, a particular message from a data source of the one or more data sources, wherein the particular message comprises a particular data record having one or more data record properties;

identify, using one or more computations performed on the one or more data record properties of the particular data record of the particular message, a particular storage object group, wherein the one or more data record properties on which the computations are performed are indicated in the client-specified indication obtained via the one or more programmatic interfaces; and cause to be stored, at a storage destination by the data transfer service, a version of at least a portion of contents of the particular data record, wherein the storage destination comprises the particular storage object group identified using one or more computations performed on one or more data record properties of the particular data record.

17. The one or more non-transitory computer-accessible storage media as recited in claim 16, storing further program instructions that when executed on or across the one or more processors:
  receive, at the data transfer service via the one or more programmatic interfaces, a transformation rule, wherein the version of the portion of contents of the particular data record which is stored at the storage destination is determined at least in part by applying the transformation rule to the portion of contents.

18. The one or more non-transitory computer-accessible storage media as recited in claim 16, storing further program instructions that when executed on or across the one or more processors:
  utilize, to perform at least one computation of the one or more computations, a server-less dynamically provisioned computing service of a provider network.

19. The one or more non-transitory computer-accessible storage media as recited in claim 16, storing further program instructions that when executed on or across the one or more processors:
  provide, from the data transfer service via the one or more programmatic interfaces, one or more metrics collected with respect to a plurality of storage object groups to which content of data records of the one or more data sources are directed, including the particular storage object group.

20. The one or more non-transitory computer-accessible storage media as recited in claim 16, storing further program instructions that when executed on or across the one or more processors:
  cause to be presented, via a graphical user interface, an indication of a plurality of properties of an example data record; and
  receive, via the graphical user interface, an indication of at least one data record property of the one or more data record properties to be used to dynamically identify the respective storage object group.

\* \* \* \* \*